US008626449B2

(12) United States Patent
Prather et al.

(10) Patent No.: US 8,626,449 B2
(45) Date of Patent: Jan. 7, 2014

(54) BIOLOGICAL CELL SORTING AND CHARACTERIZATION USING AEROSOL MASS SPECTROMETRY

(75) Inventors: Kimberly A. Prather, Encinitas, CA (US); Joseph E. Mayer, Encinitas, CA (US)

(73) Assignee: The Regents of the University of California, Oakland, CA (US)

( * ) Notice: Subject to any disclaimer, the term of this patent is extended or adjusted under 35 U.S.C. 154(b) by 668 days.

(21) Appl. No.: 12/446,130

(22) PCT Filed: Oct. 17, 2007

(86) PCT No.: PCT/US2007/081699
§ 371 (c)(1),
(2), (4) Date: Dec. 8, 2010

(87) PCT Pub. No.: WO2008/127376
PCT Pub. Date: Oct. 23, 2008

(65) Prior Publication Data
US 2011/0071764 A1 Mar. 24, 2011

Related U.S. Application Data

(60) Provisional application No. 60/829,860, filed on Oct. 17, 2006.

(51) Int. Cl.
*G06F 19/00* (2011.01)
*H01J 49/00* (2006.01)

(52) U.S. Cl.
USPC .......... 702/22; 250/281

(58) Field of Classification Search
USPC .......... 702/22
See application file for complete search history.

(56) References Cited

U.S. PATENT DOCUMENTS

| | | | |
|---|---|---|---|
| 5,382,794 A | 1/1995 | Downey et al. |
| 5,518,591 A | 5/1996 | Pulliainen et al. |
| 5,681,752 A | 10/1997 | Prather |
| 5,993,634 A | 11/1999 | Simpson et al. |
| 5,998,215 A | 12/1999 | Prather et al. |
| 6,959,248 B2 | 10/2005 | Gard et al. |

(Continued)

FOREIGN PATENT DOCUMENTS

| | | |
|---|---|---|
| WO | 00/63683 | 10/2000 |
| WO | 01/25774 | 4/2001 |
| WO | 2008/049038 | 4/2008 |
| WO | 2008/127376 | 10/2008 |

OTHER PUBLICATIONS

Bhave, P.V., et al., "Source Apportionment of Fine Particulate Matter by Clustering Single-Particle Data: Tests of Receptor Model Accuracy," Environmental Science & Technology, 35(10):2060-2072, Apr. 2001.

(Continued)

*Primary Examiner* — Bryan Bui
(74) *Attorney, Agent, or Firm* — Perkins Coie LLP

(57) ABSTRACT

Among other things, methods, systems, apparatus for performing on-the-fly apportionment are described. In particular, spectrum data associated with a particle is acquired in real-time. The acquired real-time spectrum data is analyzing in real-time to classify the particle. Analyzing the data in real-time includes comparing the acquired spectrum data with a library of known mass spectral fingerprints to obtain a match.

24 Claims, 18 Drawing Sheets

(56) References Cited

U.S. PATENT DOCUMENTS

| | | | | |
|---|---|---|---|---|
| 2003/0083826 | A1 * | 5/2003 | Moshe | 702/27 |
| 2003/0132114 | A1 | 7/2003 | Mischak et al. | |
| 2003/0235919 | A1 * | 12/2003 | Chandler | 436/43 |
| 2006/0292246 | A1 * | 12/2006 | Wu et al. | 424/725 |
| 2011/0303837 | A1 | 12/2011 | Prather et al. | |

OTHER PUBLICATIONS

Gard, E. et al., "Real-Time Analysis of Individual Atmospheric Aerosol Particles: Design and Performance of a Portable ATOFMS," Analytical Chemistry, 69(20):4083-4091, Oct. 1997.

Gross, D.S. et al., "Stability of single particle tracers for differentiating between heavy- and light-duty vehicle emissions," Atmospheric Environment, 39(16):2889-2901, May 2005.

International Search Report and Written Opinion dated Jan. 16, 2009, for PCT/US2007/081699, filed Oct. 17, 2007, 8 pages.

International Search Report and Written Opinion dated Jun. 3, 2008, for PCT/US2007/081701, filed Oct. 17, 2007, 8 pages.

Jordan, R.M., "TOF Fundamentals Tutorial," TOF Tutorial by Jordan TOF Products, Inc., <http://rmjordan.com/Resources/Tutorial.pdf>, (18 pages), accessed Dec. 20, 2010.

Moffet, R.C., et al., "Extending ATOFMS Measurements to Include Refractive Index and Density," Analytical Chemistry, 77(20):6535-6541, Aug. 2005.

Nordmeyer, T., et al., "Real-Time Measurement Capabilities Using Aerosol Time-Of-Flight Mass Spectrometry," Analytical Chemistry, 66(20):3540-3542, Oct. 1994.

Poon, G., et al., "Development of the Aircraft-Aerosol Time-of-Flight Mass Spectrometer (A-ATOFMA)," 24th Annual American Association for Aerosol Research (AAAR) Conference, Austin, Texas, Oct. 17-21, 2005, Abstract No. 1PH31, p. 67, <http://www.aaar.org/meetings/05AnnualConf/conf_abstracts_aug30_05.pdf>, accessed on Dec. 20, 2010.

Prather, K.A., et al., "Real-Time Characterization of Individual Aerosol Particles Using Time-Of-Flight Mass Spectrometry," Analytical Chemistry, 66(9):1403-1407, May 1994.

Pratt, K.A., et al., "Development and Characterization of an Aircraft Aerosol Time-of-Flight Mass Spectrometer," Analytical Chemistry, 81(5):1792-1800, Jan. 2009.

Rebotier, T.P., et al., "Aerosol time-of-flight mass spectrometry data analysis: A benchmark of clustering algorithms," Analytica Chimica Acta, 585(1):38-54, Feb. 2007.

Shields, L.G., "Determination of single particle mass spectral signatures from heavy-duty diesel vehicle emissions for PM2.5 source apportionment," Atmospheric Environment, 41(18):3841-3852, Jun. 2007.

Sodeman, D.A., et al., "Determination of Single Particle Mass Spectral Signatures from Light-Duty Vehicle Emissions," Environmental Science & Technology, 39(12):4569-4580, May 2005.

Su, Y.X., et al., "Development and characterization of an aerosol time-of-flight mass spectrometer with increased detection efficiency," Analytical Chemistry, 76(3):712-719, Feb. 2004.

Toner, S.M., et al., "Single particle characterization of ultrafine and accumulation mode particles from heavy duty diesel vehicles using aerosol time-of-flight mass spectrometry," Environmental Science & Technology, 40 (12):3912-3921, Jun. 2006.

Toner, S.M., et al., "Using mass spectral source signatures to apportion exhaust particles from gasoline and diesel powered vehicles in a freeway study using UF-ATOFMS," Atmospheric Environment, 42(3):568-581, Jan. 2008.

* cited by examiner

| Parameters | Linear-Configuration | Z-Configuration |
|---|---|---|
| |  |  |
| Ion Transmission | 42% | 100% |
| Mass Resolution | 230 | 600 |
| Upper Mass Limit | <300 | >10,000 |

BIOLOGICAL CELL SORTING AND CHARACTERIZATION USING AEROSOL MASS SPECTROMETRY

CROSS-REFERENCE TO RELATED APPLICATIONS

This application is a national stage application of and claims the benefit of PCT Application No. PCT/US2007/081699, filed on Oct. 17, 2007, and published as WO 2008/127376, which claims priority to U.S. Patent Application Ser. No. 60/829,860, filed on Oct. 17, 2006. The disclosure of the prior applications is considered part of (and is incorporated by reference in) the disclosure of the this application.

FEDERALLY SPONSORED RESEARCH OR DEVELOPMENT

This invention was made with government support under Contract No. ATM0321362 awarded by the National Science Foundation. The government has certain rights in the invention.

TECHNICAL FIELD

This application relates to mass spectrometry instruments and analysis.

BACKGROUND

The role of aerosols in atmospheric chemistry has recently become of great interest, because relatively little is known regarding the reactivity and transport of environmental aerosols. The catalytic effect of aerosol particles in heterogeneous (gas-particle) reactions occurring in the atmosphere is known to depend on both the particle's surface area and the particle's chemical composition.

Aerosol characterization also can be important in the medical and industrial fields. Great efforts have been made to study the effects of particles in biological systems, particularly on the human lungs and cardiovascular system. Although carcinogenicity and toxicity both depend on chemical composition, the chemical will have little influence on the body unless it is in some way retained. Particles ranging from ultrafine (<100 nm) up to 10 microns are of interest because they are the most likely to serve as carriers of toxic chemicals and to be deposited in some part of the human body (i.e. lungs, bloodstream, liver, heart, brain) for significant time durations. Due to health concerns, industries that require employees to operate in dust-laden environments, e.g., mines, also are interested in aerosol characterization. Further, may need to determine the contents of the air to maintain clean semiconductor devices.

In addition, the ATOFMS can be designed to identify various biological particles and sources including single cells and microorganisms. For example, specific cell (e.g., cancer cell) can be identified among a tissue sample to identify a target of pharmacological agents and to confirm that enough of the cancer cells were removed during surgery (pathology application).

Mass spectrometry is a technique for analyzing many types of environmental and biological samples, including aerosols. When combined with some means to determine particle size, mass spectrometry can provide means for determining both the size and chemical composition of particles in a polydisperse sample. Mass spectrometers generally include the following four basic steps as part of their analysis: 1) sample introduction; 2) sample volatilization and ionization; 3) mass separation; and 4) ion detection. Numerous routines can be used to perform each of these steps, although not all may be compatible with aerosol characterization. Sample introduction into a mass spectrometer for aerosol characterization can be performed in one of following two ways: (1) placing the sample on a surface, or (2) forming a particle beam by free jet expansion into a vacuum. Sample volatilization and ionization in the case of aerosol mass spectrometric analysis can utilize any of numerous suitable techniques, including, for example, laser desorption/ionization. Mass separation also can be accomplished using any of multiple techniques, including, for example a time-of-flight mass analyzer. Finally, ion detection can be accomplished using, for example, microchannel plate detectors.

SUMMARY

In one aspect, real-time source apportionment of sampled particles includes acquiring a first signal from a first ion detector associated with positive ions of a particle. The first signal includes an attenuated signal and an unattentuated signal associated with the positive ions. A second signal is acquired from a second ion detector associate with negative ions of the particle. The second signal comprises an attenuated signal and an unattenuated signal associated with the negative ions. The acquired first and second signals are analyzed to detect whether enough positive and negative ions are detected to form a spectrum associated with the particle. When enough positive and negative ions are detected to form a spectrum, the attenuated and unattenuated signals associated with the positive ions are merged to generate a first wide dynamic range measure. In addition, the attenuated and unattenuated signals associated with the negative ions are also merged to generate a second wide dynamic range measure. A list of m/z peaks are computed based on the generated first and second wide dynamic range measures. Further, the computed list of m/z peaks are compared to a library of known mass spectral fingerprints to classify the particle.

Implementations can optionally include one or more of the following features. The first and second signals can be acquired in real-time. The computed list of m/z peaks can be compared in real time to a library of known mass spectral fingerprints to classify the particle. A baseline signal can be calculated. Computing a list of peaks can include detecting at least one of a peak, a probability of starting a peak, an peak area, an peak bias that modifies the baseline, and a peak width. In addition, the peak bias can be subtracted from the generated wide dynamic range measures. Further, detection can be performed to determine whether the subtracted signal falls above or below the baseline. In addition, the list of m/z peaks can be stored as a vector.

In addition, implementations can optionally include one or more of the following features. Comparing the computed list of m/z peaks to a library of known mass spectral fingerprints to classify the particle can include choosing an entry from the library that provides the lowest Z-score when compared with the vector. Calculating a Z-score can include performing a dot product between square roots of the entry peak areas with the square roots of the vector. When detected that the lowest Z-score is higher than a threshold value, the particle is identifying the particle as undefined. When detected that the lowest Z-score is lower than or equal to the threshold value, the particle is identified as a source particle associated with the lowest Z-score.

Further, implementations can optionally include one or more of the following features. The computed list of m/z peaks can be compared to a library of known mass spectral fingerprints that includes an adaptable library that includes sources or particles from indoor or outdoor environment. Alternatively, the computed list of m/z peaks can be compared to an adaptable library that includes sources or particles that includes at least one of mold, dust, pollen, bacteria, sea salt, coal, biomass burning, cars, diesel trucks, biological particles, dust, sea spray, vegetative detritus, and brake dust. Also, the computed list of m/z peaks can be compared to an adaptable library that includes sources or particles from at least one of ambient air or and emissions from specific sources. In some implementations, the computed list of m/z peaks can be compared to the library that is adaptable to describe each known source sampled as a collection of a few typical spectra with associated variability. Also possible is to compare the computed list of m/z peaks to the library that is adaptable to include categories of general particle types that include at least one of elemental carbon, aged organic carbon, aged elemental carbon, amines, polycyclic aromatic hydrocarbons, vanadium containing source, and ammonium containing source. The library can also be adaptable to include changes in sources due to aging. Further, the computed list of m/z peaks can be compared to the library that is adaptable to add or remove new source spectra when detected to interfere with proper classification of the particle.

In another aspect, real-time classification of particles in a sample can be performed using a system that includes a database to store updatable library of known mass spectral fingerprints. The system also include a data acquisition unit to acquire spectrum data associated with a particle in real-time. The system also includes a data processing unit connected to the data acquisition unit and the database to analyze the acquired spectrum data to classify the particle in real-time. The data processing unit compares the acquired spectrum data to the library of known mass spectral fingerprints stored in the database to obtain a match.

Implementations can optionally include one or more of the following features. The data processing unit can be designed to perform various functions For example, the data processing unit can be designed to compare the computed list of m/z peaks to an adaptable library of known mass spectral fingerprints that includes sources or particles from indoor or outdoor environment. The data processing unit can be designed to compare the computed list of m/z peaks to an adaptable library that includes sources or particles that includes at least one of mold, dust, pollen, bacteria, sea salt, coal, biomass burning, cars, diesel trucks, biological particles, dust, sea spray, vegetative detritus, and brake dust. The data processing unit can be designed to compare the computed list of m/z peaks to an adaptable library that includes sources or particles from at least one of ambient air or and emissions from specific sources. Also, the data processing unit can be designed to compare the computed list of m/z peaks to the library that is adaptable to describe each known source sampled as a collection of a few typical spectra with associated variability. Further, the data processing unit can be to compare the computed list of m/z peaks to the library that is adaptable to include categories of general particle types that include at least one of elemental carbon, aged organic carbon, aged elemental carbon, amines, polycyclic aromatic hydrocarbons, vanadium containing source, and ammonium containing source. In addition, the data processing unit can be designed to compare the computed list of m/z peaks to the library that is adaptable to include changes in sources due to aging. Also, the data processing unit is configured to add or remove new source spectra into the library stored in the database when detected to interfere with proper classification of the particle.

In yet another aspect, real-time (on-the-fly) source apportionment of sampled particles includes acquiring mass spectrum data associated with a particle in real-time. The acquired mass spectrum data is analyzed to classify the particle in real-time. Analyzing the mass spectrum data includes comparing the acquired spectrum data to a library of known mass spectral fingerprints to obtain a match.

The subject matter as described in this specification potentially can provide one or more of the following advantages. An aircraft (A)-ATOFMS can be designed to provide aircraft-based measurements. Such A-ATOFMS is capable of data acquisition rate that is up to three times faster than is possible with conventional laboratory and transportable ATOFMS. In addition, the A-ATOFMS can enable improved ion transmission and mass resolution, while being lighter, smaller, and consuming less power than conventional laboratory and transportable ATOFMS. By reducing the foot-print (i.e., physical size) and power consumption while adding shock absorption components, the A-ATOFMS can be used in light aircraft and any other mobile platforms. The improved ion transmission can enable the first detection of ions out to 10,000 m/z, which can be important for detecting biological and oligomeric aerosols. Further, an increased particle size range of 70-3000 nm can enable the investigation of the physical and chemical properties of a wide range of atmospherically-relevant aerosols.

Other features and advantages of the present invention should be apparent from the following detailed description, taken in conjunction with the accompanying drawings, which illustrate, by way of example, the principles of the invention.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

Like reference symbols and designations in the various drawings indicate like elements.

DETAILED DESCRIPTION

Figure 1:
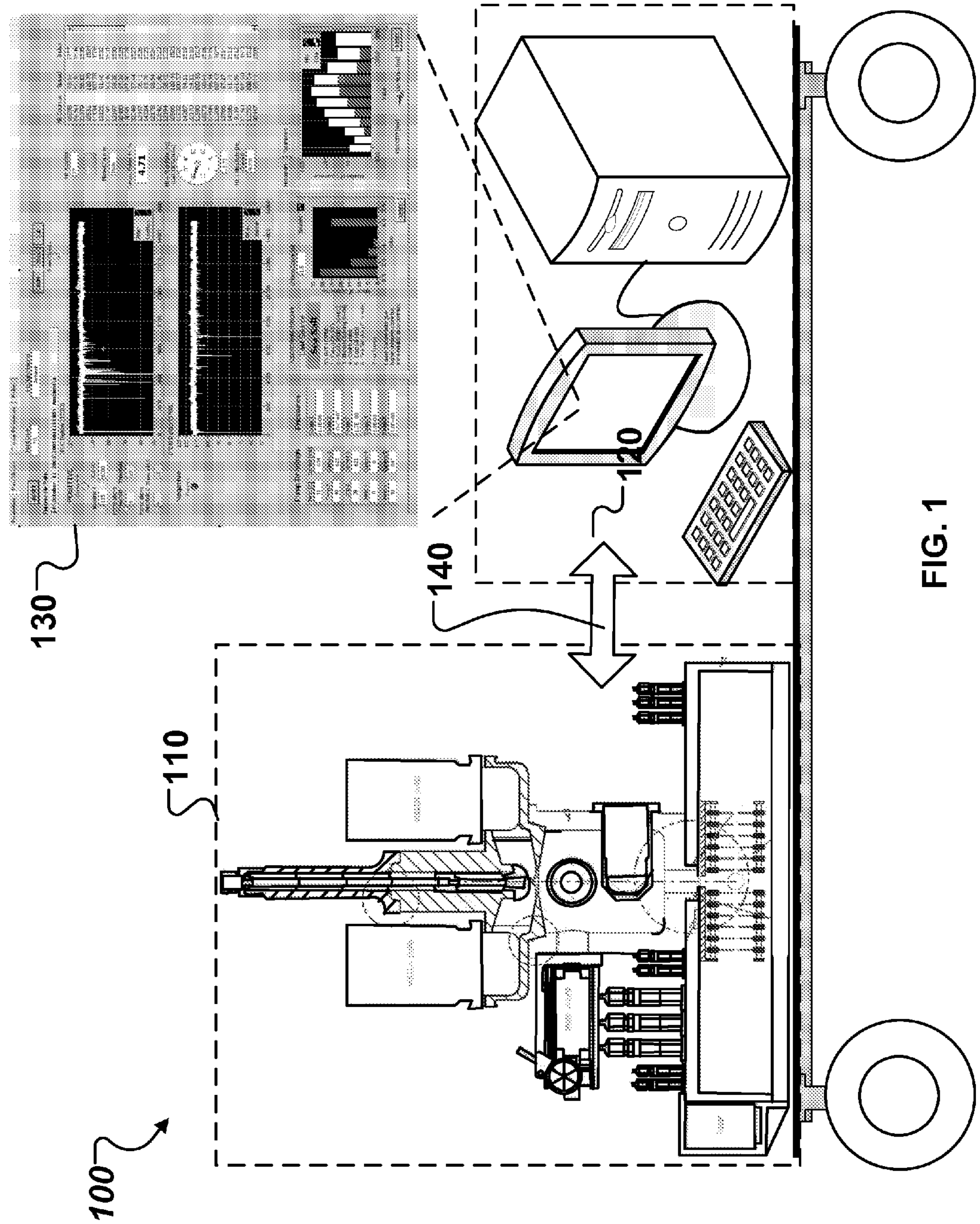
FIG. 1 illustrates a system for performing on-the-fly (real-time) source apportionment.

FIG. 1 illustrates a system 100 for performing on-the-fly (on-line or real-time) source apportionment. The system 100 includes an aerosol time-of-flight mass spectrometer (ATOFMS) 110 and system control hardware 120 executing data acquisition and control (DAC) software 130. The system control hardware 120 interfaces with the ATOFMS 110 using a data communication link 140 to control operation of the ATOFMS and receive data from the ATOFMS 110. Data acquisition and control of the ATOFMS 110 is performed by the DAC software 120 executing on the system control hardware 120.

The system 100 is controlled by the system control hardware 120 that can include various data processing devices. For example, the system control hardware 120 can be implemented as a rack mounted PC with an Intel P4 3.2 GHz processor, 2 GB RAM, and Microsoft Windows XP Pro SP 2 operating system. Mass spectral data from the ATOFMS 110 is digitized using two Acqiris 2 channel fast data acquisition boards with a 1 GHz sampling rate for wide dynamic range ion signal acquisition (may want to add this description). Files that represent at least the digitized data are saved onto a removable 80 GB 7200 rpm IDE hard drive (Western Digital, Lake Forest, Calif.). The system control hardware 120 can include other computer PCI boards that enables control of the ATOFMS 110 and data acquisition. For example, a 96 pin digital I/O board (model DIO96, National Instruments Corp., Austin, Tex.) can be provided to retrieve a timing circuit counter number and send reset command. In addition, a 16 channel RS-232 board (model 16 port serial breakout box, National Instruments Corp., Austin, Tex.) can be used to monitor and control various component of the ATOFMS 110 such as the pumps, pressures, and laser power meter (model Molectron EPM1000, Coherent, Inc, Santa Clara, Calif.).

The system control system 120 interfaces with the ATOFMS 110 using various wired connections as described above. In addition, other wired and wireless connections can be implemented. For example, the wired data connections can include various universal serial bus (USB) connections, serial transmission mechanisms, parallel transmission mechanisms, etc. Wireless data connections can include wireless fidelity (WiFi), FireWire, WiMax, etc. In some implementations, the system control system 120 is located at a remote location and controls the ATOFMS and acquires data from the ATOFMS over a network connection such as local area network (LAN), wide area network (WAN) and the internet.

Aerosol time-of-flight mass spectrometers can be used to measure the precise size and chemical composition of individual aerosol particles, in real time. Such systems can be used to characterize a wide range of aerosol particles, including secondhand tobacco smoke, suspended soil dust, sea salt, aerosols, and a variety of combustion particles. Such systems also can be used to monitor the evolution of individual aerosol particles in the atmosphere over time. ATOFMS systems that are configured as portable instruments are suitable for use in studying the direct effect of aerosols on visibility, pollution levels, and the global radiation balance. In addition, the ATOFMS can be designed to identify various biological particles and sources including single cells and microorganisms. For example, specific cell (e.g., cancer cell) can be identified among a tissue sample to identify a target of pharmacological agents and to confirm that enough of the cancer cells were removed during surgery (pathology application).

Figure 2A:
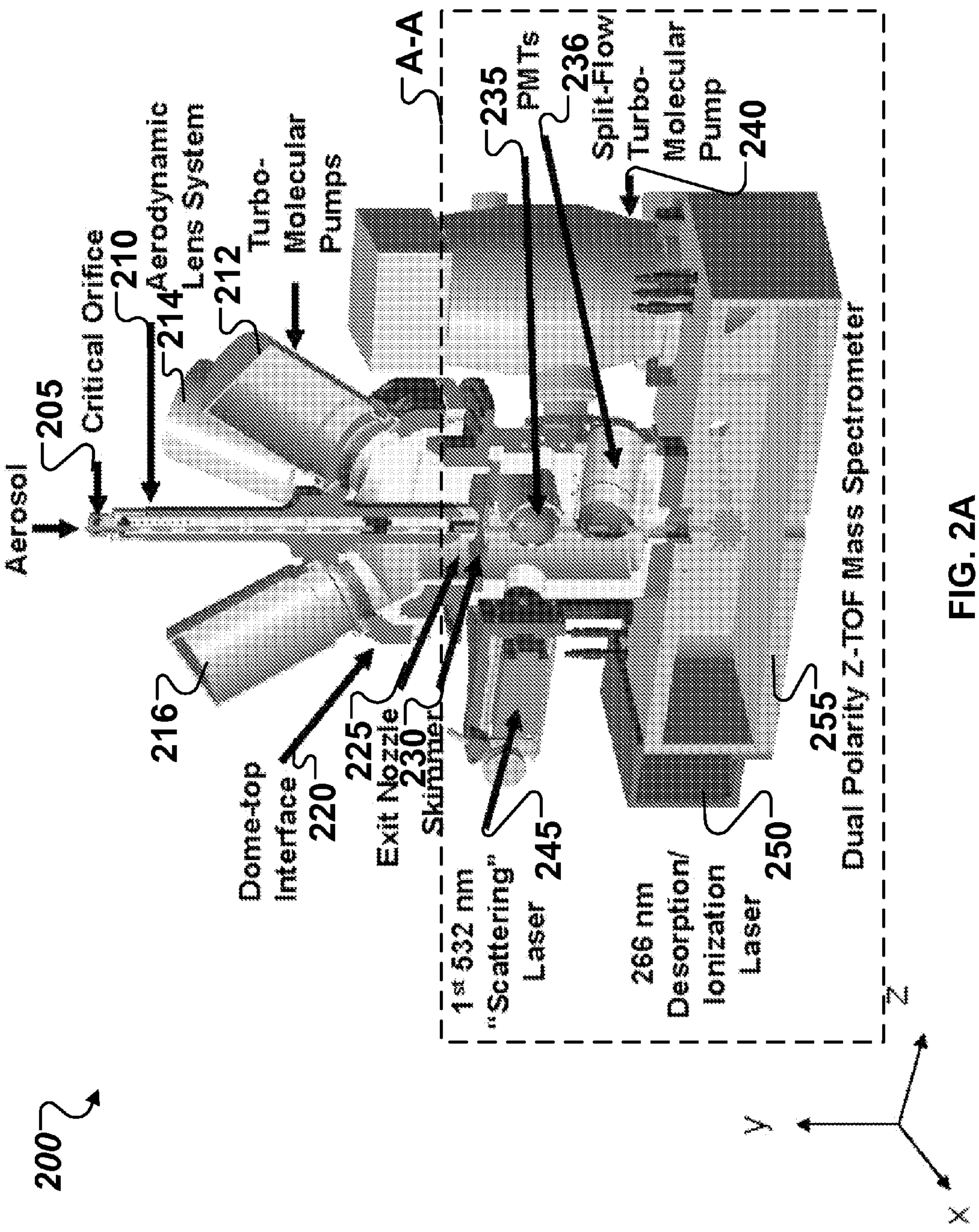
FIGS. 2A, 2B illustrate an example ATOFMS designed to have a small foot-print and increased data acquisition capabilities.
Figure 2B:
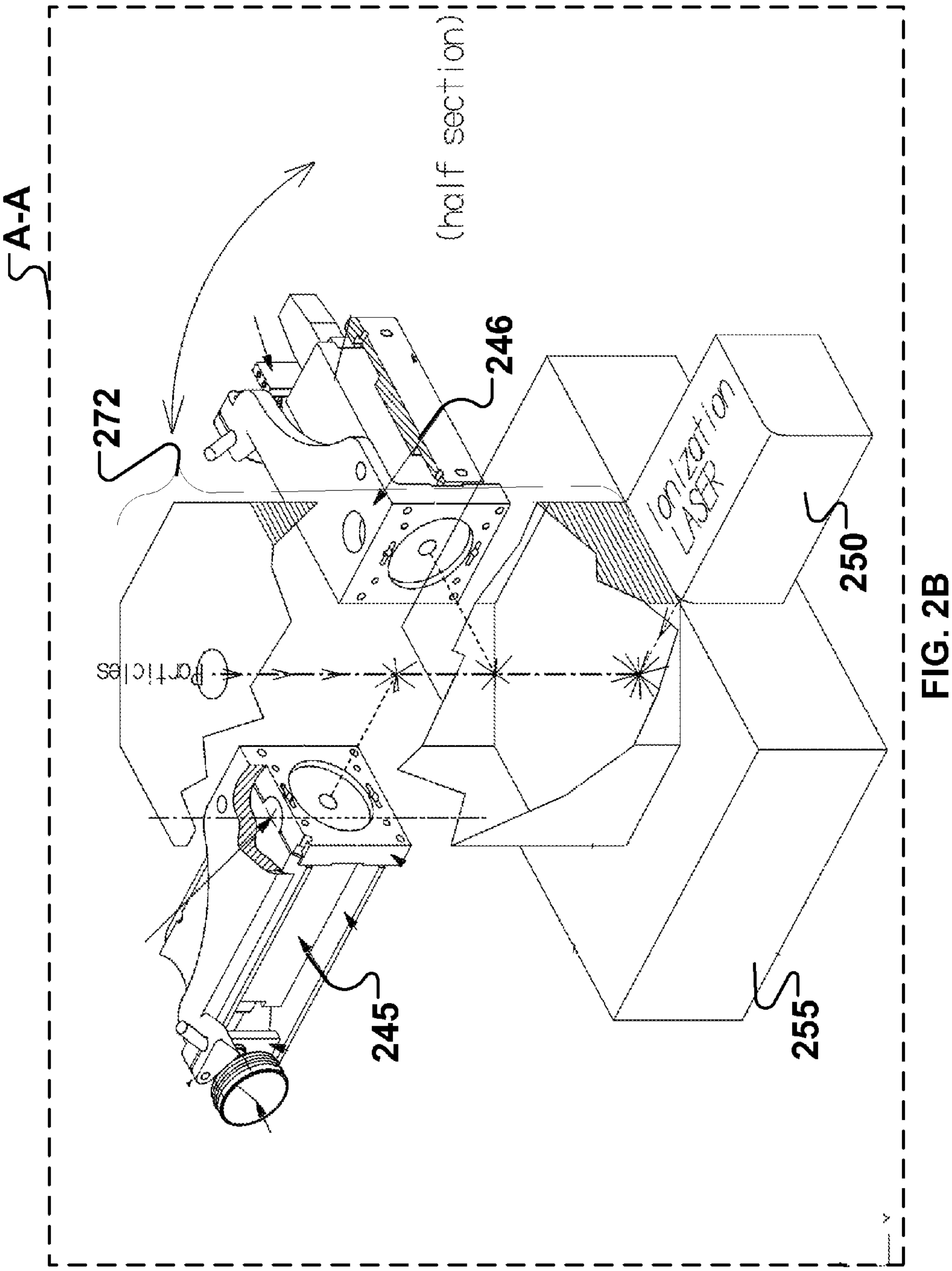

FIGS. 2A, 2B, 2C, 2D illustrate an example ATOFMS 200 designed to have a small foot-print and increased data acquisition capabilities. The ATOFMS 200 is constructed using various components. For example, the example ATOFMS 200 as illustrated includes a critical orifice 205, an aerodynamic lens system 210, multiple turbomolecular pumps (212, 214, 216, 218), a dome-top interface 220, an exit nozzle 225, a skimmer 230, one or more photomultiplier tubes (PMTs) 235, a split-flow turbo-molecular pump 240, two light scattering lasers 245, 246, a desorption/ionization laser 250, and a mass spectrometer 255. FIGS. 2A, 2B are illustrative of the example ATOFMS 200 only and the total number of each components used can vary depending on the application.

The example ATOFMS 200 can be implemented as a combination of various systems including an inlet system 260, a light scattering system 270, a pump system 280, and a mass spectrometer system 290. Each of these systems 260, 270, 280 and 290 includes one or more of the ATOFMS components described above and provides various functionalities.

The inlet system 260 is designed to provide a reduced volume when compared to other conventional ATOFMS. For example, the inlet system 260 can provide a volume that is reduced by ¾ compared to the previous ultrafine (UF)-ATOFMS25. In addition, the inlet system features an adjustable dome top interface 220 designed to align the particle beam, enable symmetric pumping, and enable testing of a variable number (1-4) of turbo molecular pumps. The dome top interface 220 includes two concentric hemispheres mating with hardened aluminum surfaces. Threaded adjusters can be provided to vary the dome position, which is monitored (e.g., using analog dial gauges). Threaded adjusters enables accurate alignment and quick verification that alignment has not changed.

The inlet system 260 also includes the aerodynamic lens system 210. A variable number of turbo molecular pumps can be tested to determine their effect on the aerodynamic lens performance and to experimentally determine the minimum number of pumps required to reduce the weight and power consumption. Small adjustments (±0.005 inches in the x-y plane) of the dome-top interface 220 alignment may not result in any measurable effect on the scattering rate. Because slight adjustments of the dome-top interface 220 alignment may be needed to align the particle beam, in some implementations, a fixed dome-top interface 220 is used to minimize weight and complexity while rigidly maintaining the alignment in a harsh vibrating operating environment.

The light scattering system 270 can be designed to enable easy alignment of the scattering laser 245 in both horizontal (X), perpendicular to particle beam, and vertical (Y), parallel to the particle beam, directions. The light scattering system 270 uses a mounting mechanism that enables vertical (Y) alignment with shims, so the vertical alignment is set once with a centering jig prior to mounting the scattering laser 245 to the instrument and needs no further adjustment. Horizontal (X) adjustment is easy and repeatable, using nested cylinder joints and a dial indicator gauge. This is an improved design over other systems such as those that utilize a ball and socket joint that enables swift alignment, but is difficult to use in practice as both the X and Y directions are free to move about at the same time. The scattering laser used includes a 532 nm scattering laser manufactured by JDS Uniphase. The JDS Uniphase laser provides RS-232-C controllability and improved beam characteristics.

The pumping system 280 is implemented to provide various pumping configurations and operating pressures. The pumping system 280 includes various pumps that operate over multiple pumped sections. For example, three differentially pumped sections including (1) the aerodynamic lens system 210, (2) a sizing (scattering) region 272 (includes 2 scat lasers and 2 PMT's for light detection), and (3) the mass spectrometer 255. The pumping system 280 uses smaller pumps to reduce cost, power draw, and weight. For example, the pumping system 280 includes a much smaller and lighter inlet with three 70 L/s turbo-molecular vacuum pumps 215 (model Turbo-V 70LP, Varian Vacuum Technologies, Torino, Italy) on the exit of the aerodynamic lens system 210 and one 250 L/s split-flow turbo-molecular vacuum pump 240 (model Turbo-V 301 SF Navigator, Varian Vacuum Technologies, Torino, Italy) on the mass spectrometer 255. The pumping system 280 can optionally include an optional 70 L/s turbo-molecular vacuum pump (not shown) on the sizing region 272. A secondary inlet (11 L/s) on the split-flow turbo-molecular vacuum pump (TV-301SF) backs the four 70 L/s pumps. One or more turbo pump controllers (not shown) interfaces with the system control hardware 120 to enable control and monitoring of the pumps 212, 214, 216, 218 and 245. The split-flow turbo-molecular vacuum pump 245 is backed by two diaphragm rough pumps (not shown): a UN726.1.2 ANI parallel pump and a UN726.3 ANI two stage (KNF NEUBERGER, INC., Trenton, N.J.) pump. The two heads on the first rough pump are in parallel (38 L/min), and the two heads on the second are in series (20 L/min).

Typical operating pressures are ~1.7 Torr for the relaxation region 211 (model 626A Baratron Capacitance Manometer, MKS Instruments, Wilmington, Mass.), ~6x10-3 Torr after the aerodynamic lens system 210 (model 345 HPS® Pirani sensor, MKS Instruments, Wilmington, Mass.), ~3x10-4 Torr in the aerodynamic sizing region 272 (same as the scattering or sizing region described above) (model I-Mag 423, MKS Instruments, Wilmington, Mass.), ~7x10-7 Torr in the mass spectrometer 255 (model I-Mag 423, MKS Instruments, Wilmington, Mass.), and ~8.5 Torr in the fore line (not shown) (model 345 HPS® Pirani sensor, MKS Instruments, Wilmington, Mass.) between the TV-301 and first rough pump. The aerodynamic sizing region 272 is separated from the mass spectrometer 255 by a ball valve which can be closed to isolate the mass spectrometer 255 and keep the ion detectors under vacuum while the remainder of the instrument is serviced.

The mass spectrometer 255 can be implemented as a dual polarity Z configuration time-of-flight (Z-TOF) mass spectrometer. The dimensions of the Z-TOF mass spectrometer 255 are designed to be substantially smaller than other conventional mass spectrometers. For example, the Z-TOF mass spectrometer 255 can be designed to have a length and a volume that are 31% and 43% of the conventional ATOFMS coaxial mass spectrometer. The example A-ATOFMS mass spectrometer dimensions are 49×29×11.3 cm (L×W×H) compared to 159×15×15.5 cm for the transportable ATOFMS. The shorter length results in a much smaller package and enables the A-ATOFMS to be placed in a light aircraft, for example.

Figure 2C:
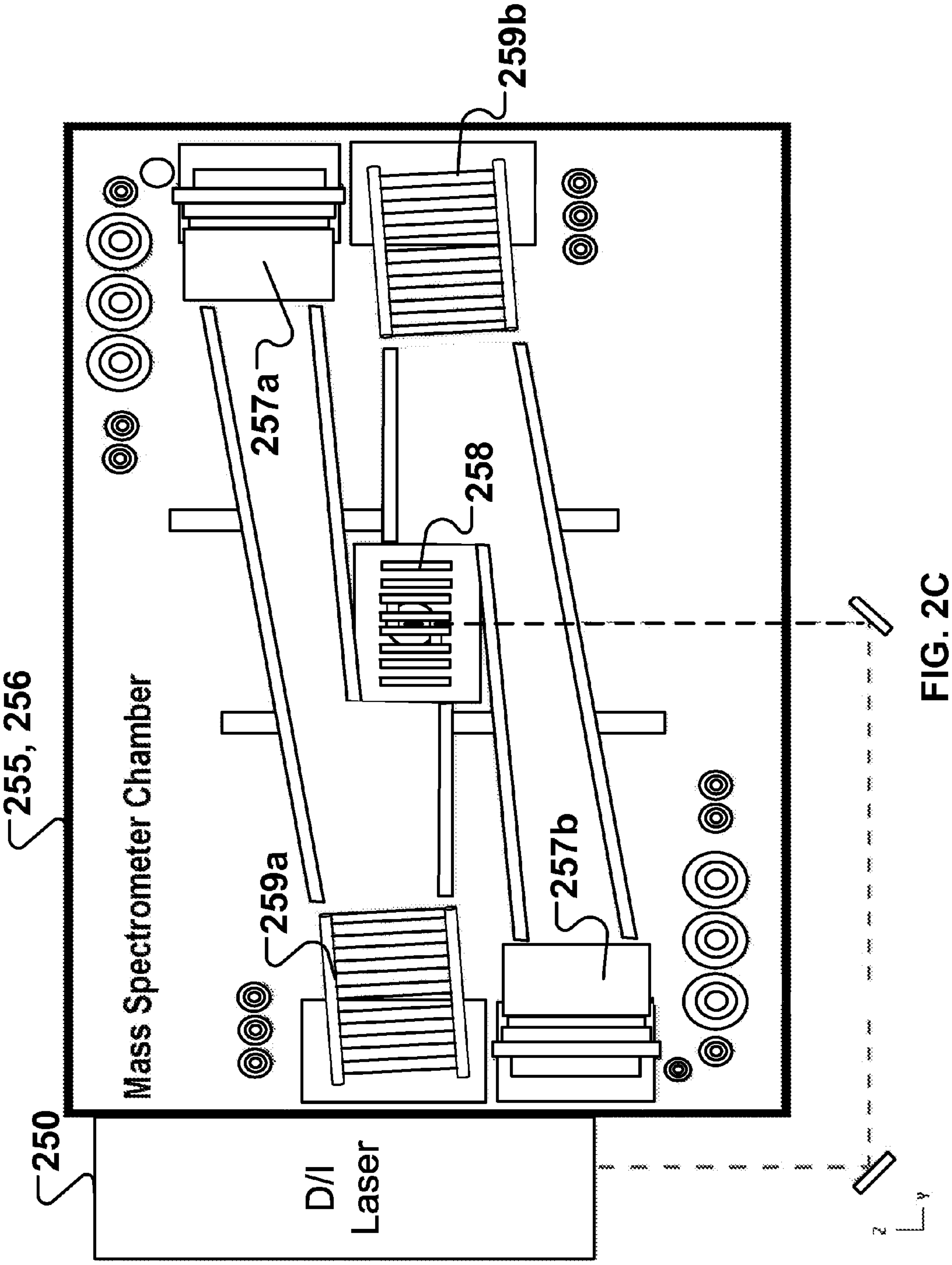
FIG. 2C shows a mass spectrometer of an ATOFMS implemented as the Z-TOF having a compact dual polarity grid-less reflectron design.

FIG. 2C shows the mass spectrometer 255 implemented as the Z-TOF having a compact dual polarity gridless reflectron design. The mass spectrometer performance is improved by using detailed ion simulations (SIMION 3D 7.0 developed by David Dahl, Idaho National Lab, Scoville, Id.) and geometry optimization. The design of the Z-TOF includes the following assemblies: (1) a single ion source region 253, (2) 2 flight tubes—(they run between the detectors and the reflectrons—i.e. between 257*a* and 259A is one flight tube and between 257*b* and 259*b* is the other flight tube), 2 reflectrons 259*a* and 259*b*, and 2 detectors 257*a* and 257*b*. The modular design of the Z-TOF enables easy assembly and simplifies maintenance. The negative/positive ions are extracted with plates separated by 6.0 mm at +/−3 kV, accelerated to 8-10 kV, spatially focused with an electrostatic Einzel lens at +/−2 kV before entering a field free region at +/−8 to 10 kV, and then refocused in a reflectron 259*a*, 259*b* onto an ion detector 257*a*, 257*b*. The ion flight path is 5.9 cm long and typical flight times are ~7 μs for m/z 100 Daltons. The desorption/ionization (DI) laser 250 light is focused with a lens (f=75 mm), enters the TOF mass spectrometer 255 through a fused silica window, passes through two 5.0 mm apertures in the flight tube and enters the source region before exiting through two similar apertures in the opposite flight tube and window in the Z-TOF mass spectrometer 255.

The LDI laser power measured at the exit of the Z-TOF mass spectrometer 255 is typically ~1 mJ from the custom Big Sky (Montana) 50 Hz laser. The voltages on the Z-TOF mass spectrometer 255 are computer controlled and monitored by a custom high voltage supply (Tofwerk A G, Thun, Switzerland). A custom software safely ramps the high voltages, and a hardware pressure interlock protects the detectors 257*a*, 257*b* against damage due to sudden pressure increases. The bipolar detectors 257*a*, 257*b* use a MCP, scintillator, and photomultiplier tube and hence optically decouple the signal from high voltage, thereby additionally providing protection from damage to the expensive and sensitive DA boards caused by any potential arcing in the Z-TOF mass spectrometer 255.

Figure 2D:
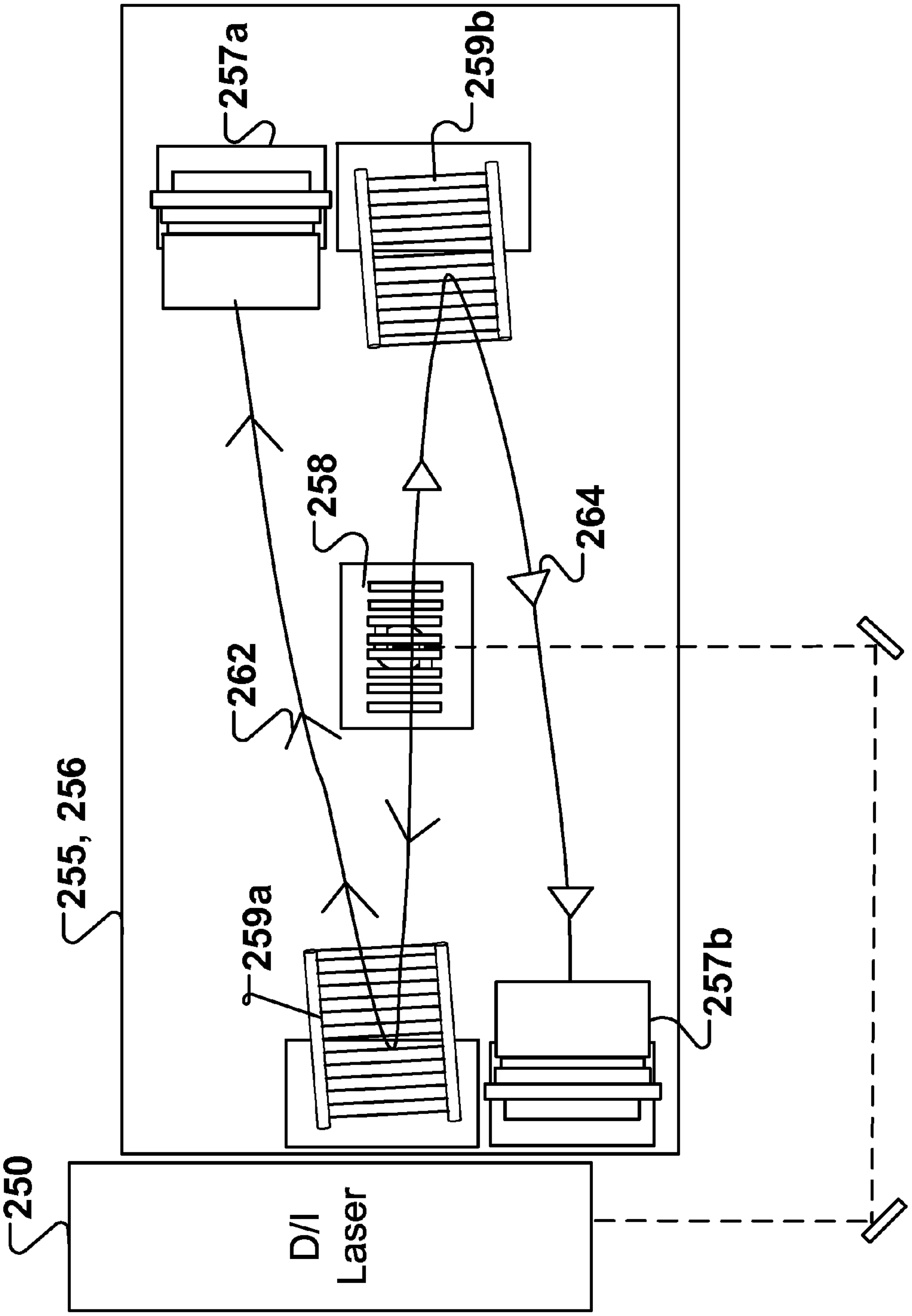
FIGS. 2D illustrates a folded path geometry of a Z-TOF mass spectrometer.

FIGS. 2D illustrates a folded path geometry of the Z-TOF mass spectrometer designed to minimize the size of the mass spectrometer's 255 chamber (or housing) 256 and to improve the ion detection performance. The folded path geometry provides a path for positive ions 262 (i.e., first flight tube) in an opposite direction to a path for negative ions 264 (second flight tube) and forms a Z-shaped (or S-shaped) geometry. Positive and negative ion reflectrons 259*a*, 259*b* are placed away from, and at opposite sides of, an ion extractor 258. The two reflectrons 259*a*, 259*b* are each oriented to angularly reflect impinging ions (positive and negatively charged) received from the ion extractor 258 along a reflection path 262, 264 toward a respective ion detector 257*a*, 257*b* located near the opposite end of the mass spectrometer chamber 256. This design creates a folded Z-configuration path for the positive and negative ions, which lengthens the effective ion path length for a given chamber dimension (i.e., the ion path is longer than the length of the chamber). This Z-configuration thereby increases the time spread for ions of different mass-to-charge ratios to reach the ion detector 257*a*, 257*b*. This is an improvement over the conventional co-axial design that sends the ions down and back in the same flight tube. The conventional co-axial design does not take advantage of the fact that other polarity lengths (and widen it slightly) can be used for ion detection Conventional co-axial design uses only one polarity detection, and thus fails to provide the above option.

The Z-configuration also increases the detection sensitivity by reducing ion losses that occur over longer distances. Further, the Z-configuration improves the overall mass resolution. Also, each ion detector 257*a*, 257*b* can be designed to have a sensing area that covers the entire cross section of the ion beam path 262, 264 and need not include a central aperture. Such sensing area can improve the detector's 257*a*, 257*b* ion collection efficiency, and avoid aperture break down over time. also In contrast, the conventional co-axial design sends the ions out through an ion detector with a hole in the center, which can be extremely unstable (and these detectors are hard to find). Such co-axial design may require the detectors to be electronically floating, and thus makes the overall system far less stable. Thus the Z-configuration takes advantage of having detectors located at the ends of the flight tube. Further more sensitive detectors can be used in the Z-configuration since the Z-configuration does not require detectors with holes in them, which are produced in limited availability with limited performance when compared to detectors without holes.

Figure 3:
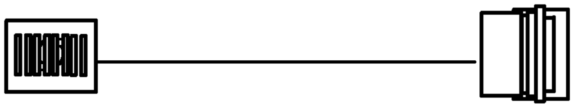
FIG. 3 is a table showing improvements provided by a Z-configuration design over a linear-configuration design.
Figure 3:
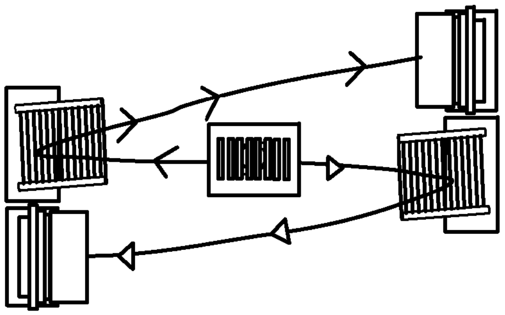

FIG. 3 is a table showing some of the improvements provided by the Z-configuration design 310 over a linear-configuration design 320. The improvements are shown for various parameters that include ion transmission efficiency, mass resolution, and upper mass limit. In addition, the Z-configuration design 310 enables transmission of up to 90% of masses in the range of 1000 to 5000 amu as compared to <1% for the linear-configuration design 320.

In some implementations, various components along the path of the particles are mounted and aligned such that the connections are substantially unaffected by vibration, shock loads, and temperature changes, which inherently occur when flying in both large and small aircraft, for example. The ATOFMS 110 is designed to set the position of the orthogonally mounted lasers 245, 246 in relation to the particle beam. The TOF extractor assembly 258 is keyed to the top of the mass spectrometer housing via a precisely sized and located boss and mating bore hole. In particular, a rectangular key protruding from the mounting base of the extractor assembly 258 fixes the base rotationally about the bore's center axis. This design is largely unaffected by temperature changes, because the distance from the mounting base to the TOF extractor centerline is relatively short.

Some connection ports may be tapered to achieve precision fitting and resistance to vibrations and changes in temperature. In addition, joining components with tapers minimizes degradation of the critical fit between mating parts frequently disassembled for cleaning. A taper inherently fits tight with its mating part at the point of least clearance/best concentricity. By contrast, a closely fitted (e.g., a clearance of about 0.0005") commonly used cylindrical boss and mating bore repeatedly put together and taken apart can show noticeable wear and tear within a short time period. Notable as well is the extreme care that must be taken to guard against galling of the closely fitted boss while it is slid into or out of its bore. As such, seemingly minor corrosion and or dirt buildup can readily result in "stuck" assemblies.

Figure 2E:
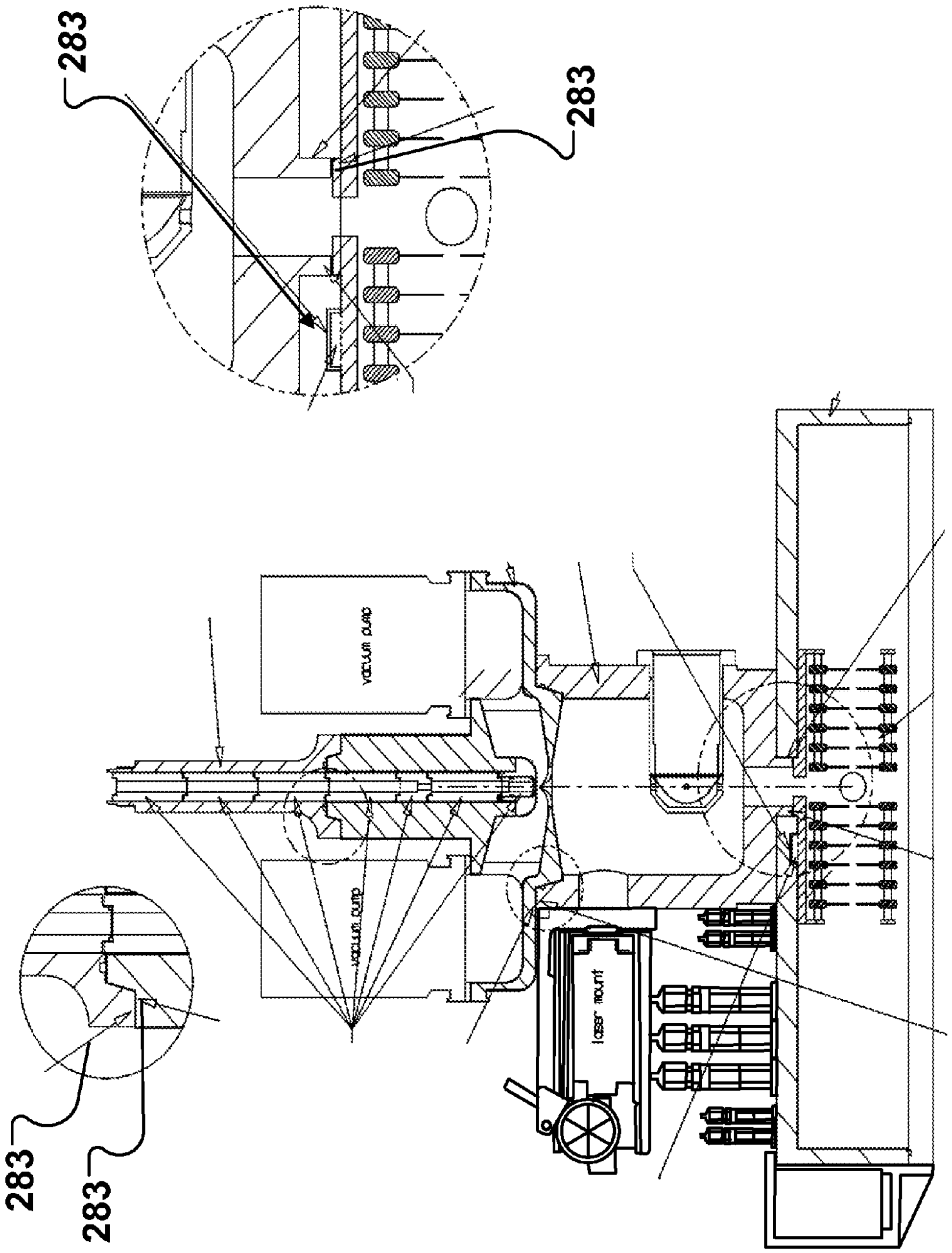
FIG. 2E illustrates the use of tapered flanges to connect various components of the ATOFMS.

Tapered connections can be readily disassembled, as the cylindrical clearance grows very large very fast with the smallest movement apart. This amount is dependent on the amount of taper employed. A taper having an included angle of about 30 degrees and having a short length with respect to its diameter can be used in the system 100 as described in this specification. The male and female tapered components both are shown with a flange. Examples of tapered flanges 283 are shown in FIG. 2E. The taper is sized such that the flanges touch each other just as the tapers touch. This approach can be used to ensure a highly concentric connection while maintaining excellent perpendicularity. In addition, the face-to-face contact of the flanges effectively controls any hard seating of the taper, which might result in a stuck or even galled joint in such a short taper length.

Figure 4:
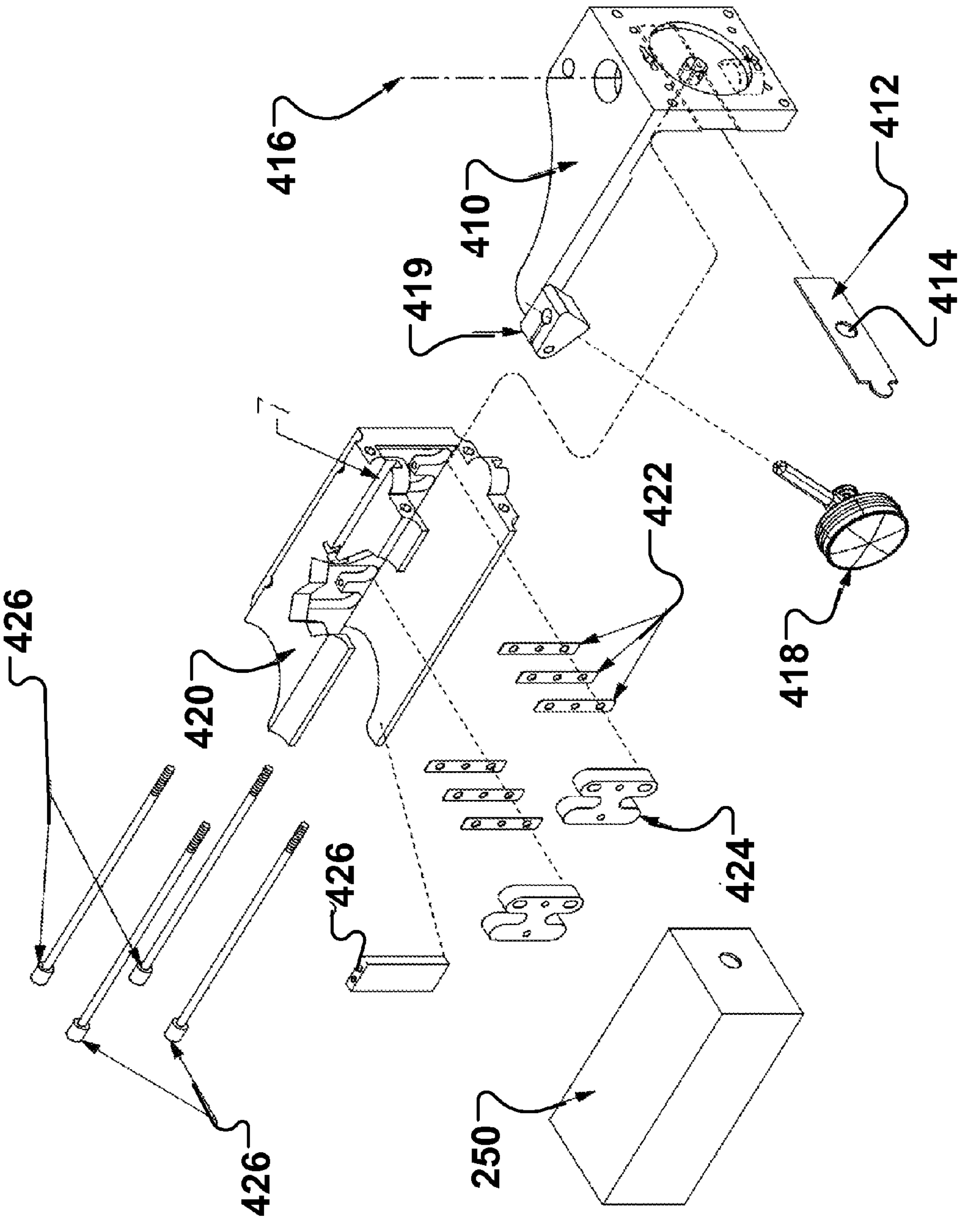
FIG. 4 is a block diagram showing an example mount design for mounting a scattering laser.

FIG. 4 is a block diagram showing an example mount design for the scattering (note there is also an LDI laser mounted to the MS region) lasers 245, 246, 250. The mount design can be used to facilitate the above operation of the system and to address issues associated with the effects of flying in various sizes of planes, temperature changes, vibration, gravitational forces, shock loads, transporting, servicing, and troubleshooting. The mount design shown in FIG. 4 can secure the laser body housing, yet allow the laser beam emitted from that housing to be aligned with the centerline axis of the precisely sized and located bore in the scattering region 272, which intersects the vertical path of the particles. The precise intersection with the particle path of the beams emitted by the two scattering lasers 245, 246 are maintained to enable the ATOFMS 110 to size particles and time the firing of the ionization laser 250.

An optimal alignment of the scattering laser occurs when its beam passes directly through center of the recess in the flange 410, while at the same time being perpendicular to the flange's 410 mounting face. The flange 410 is secured directly to the side of scattering region 272 with fasteners. In particular, the flange bore is positioned on the housing by nesting with a boss. The mount 420 includes two vertically aligned half-round recesses, which receive two vertically aligned half round bosses of the two scattering lasers 245. 246. The distance between the half round bosses of the mount 420 is greater than the distance between bases of half round recesses of the flange 410. The resulting gap allows for the use of a shim 422 to precisely adjust the vertical position of laser beam such that it is centered with respect to the recess on the mounting face of the flange 410. On the back side of the mounting face of the flange 410, a horizontal slot, centered with respect to mounting face recess, and located along the vertical centerline, accommodates a rectangular metal strip 412. The metal strip 412 is held in place by a flat metal spring, and is positively located by use of a pin protruding from one side of the horizontal recess. The metal strip 412 includes an orifice hole 414 to positively indicate when the laser is properly centered. The metal strip 412 can easily be removed and replaced by a similar strip orifice having a smaller-sized orifice, as the laser beam location gets closer to its desired position.

It is important to note that even though the path of a laser beam is perfectly straight, that path is not necessarily aligned with the laser housing and/or its mounting face. It also is important to note that the beam's path does not necessarily extend through the center of the laser housing's exit hole. In addition, various characteristics of the beam can vary over time. Thus, a mechanism that allows easy mounting of the lasers 245, 246, 250 is needed.

The scattering laser 245 is mounted by fasteners passing through holes in vertical side of a mount 420 associated with the laser. The fasteners then pass through one or more of the shims 422, an orifice slide 424, the "Z-axis" path, and finally the mounting holes of the scattering laser 245, 246. Two recesses to accommodate the orifice slide 424 are machined into the mount's 420 vertical side. These recesses provide for vertical adjustability. This allows the laser housing to be skewed as needed to compensate for the beam's path not necessarily being parallel with the housing. The shim(s) 422 are used in equal numbers, front and back, to allow for a precise adjustment of the beam's horizontal position. Sufficient shims 422 are used to ensure that the beam passes through the center of the recess in the mounting face of the flange 410.

A rotatable alignment fixture (not shown) is provided to include a flanged shaft, with identical boss and bolt pattern, and ball bearings located in a suitable housing. The fixture shaft includes a 0.5-inch through-hole, to allow passage of the laser beam. By mounting the pivoting laser mount assembly to this rotatable fixture, the entire assembly can be slowly rotated by hand, while the scattering laser 245, 246 is in operation. When the fixture is mounted to a secure, stable surface, the beam can be aimed at a suitable wall, spaced a short distance away, e.g., about 1 to 4 meters. If the scattering laser 245, 246 is out of alignment, the beam's point of impingement on the wall will transcribe a circle when the laser is rotated. Adjustments can be made using the mount's adjustment features, until such rotation produces a unmoving spot. This rotatable alignment fixture can be a part of the laser mount shown in FIG. 4.

While the mass spectrometer instrument 110 is in operation, the scattering lasers 245, 246 can be controlled to sweep their beams side-to-side across the path of particles. The mounting flanges 410 remain fixed to the side of the scattering region 272, while the two scattering lasers 245, 246 can be pivoted about their pivot axes 416. A dial indicator 418 is mounted by a clamp 419 that is a integral part of the flange 410, to provide a record of relative position, while allowing the lasers 245, 246, 250 to move and reliably return to their original positions. An indicating tip is positioned against the side of a Bridge Indicator 426. Four pivot locking screws 426 can be used to adjust and then secure the lasers 245, 246, 250, the mount against movement. The ability to sweep the scattering lasers is helpful in maintaining optimal scattering efficiency. Performance can sometimes be enhanced by finding a new laser beam "sweet spot." The feedback afforded by indicators can show when the particle beam path is being unduly affected by dirt or debris, which can steer particles.

Figure 5A:
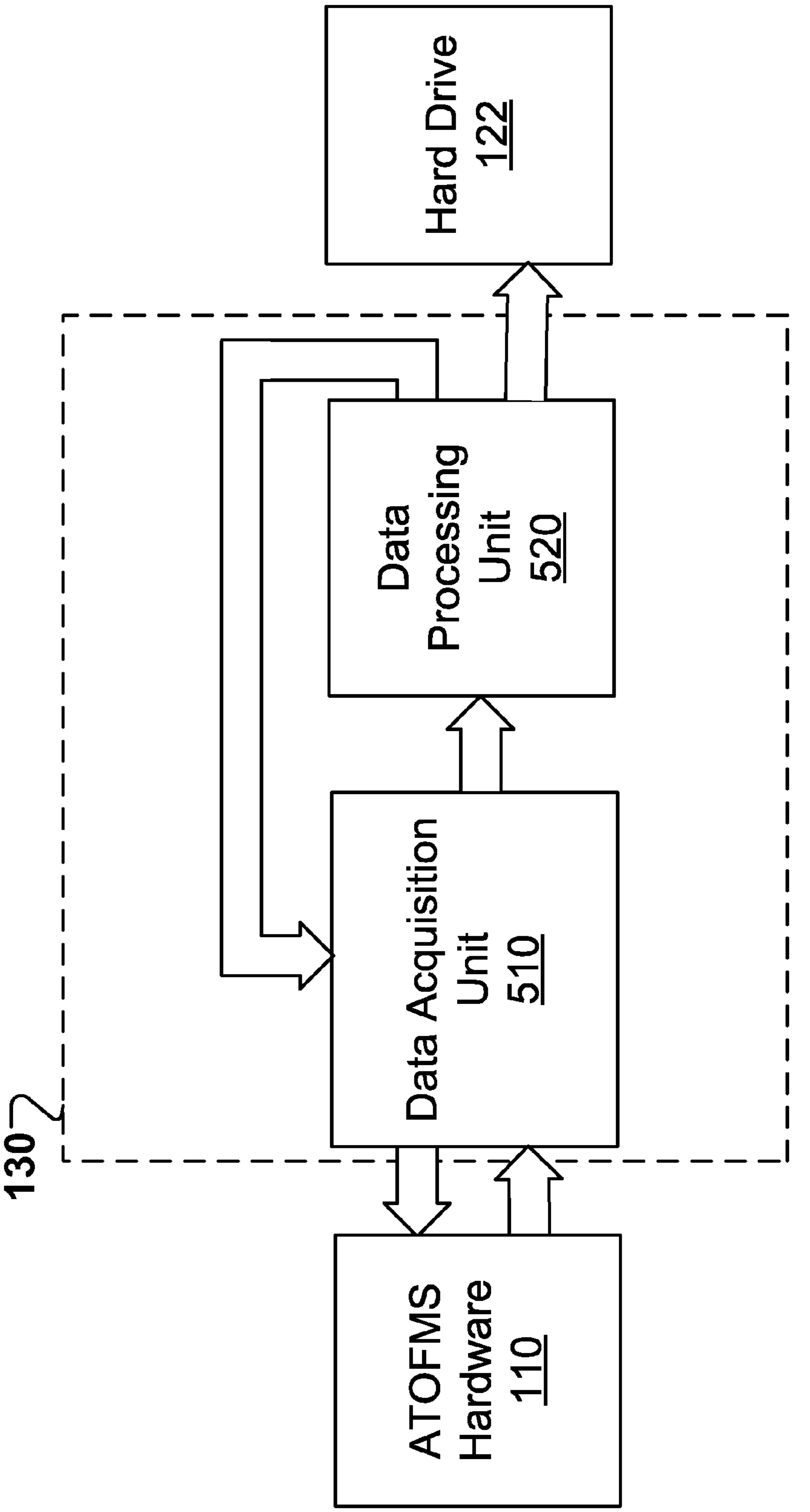
FIGS. 5A and 5B are block diagrams of a Data Acquisition and Control Software.
Figure 5B:
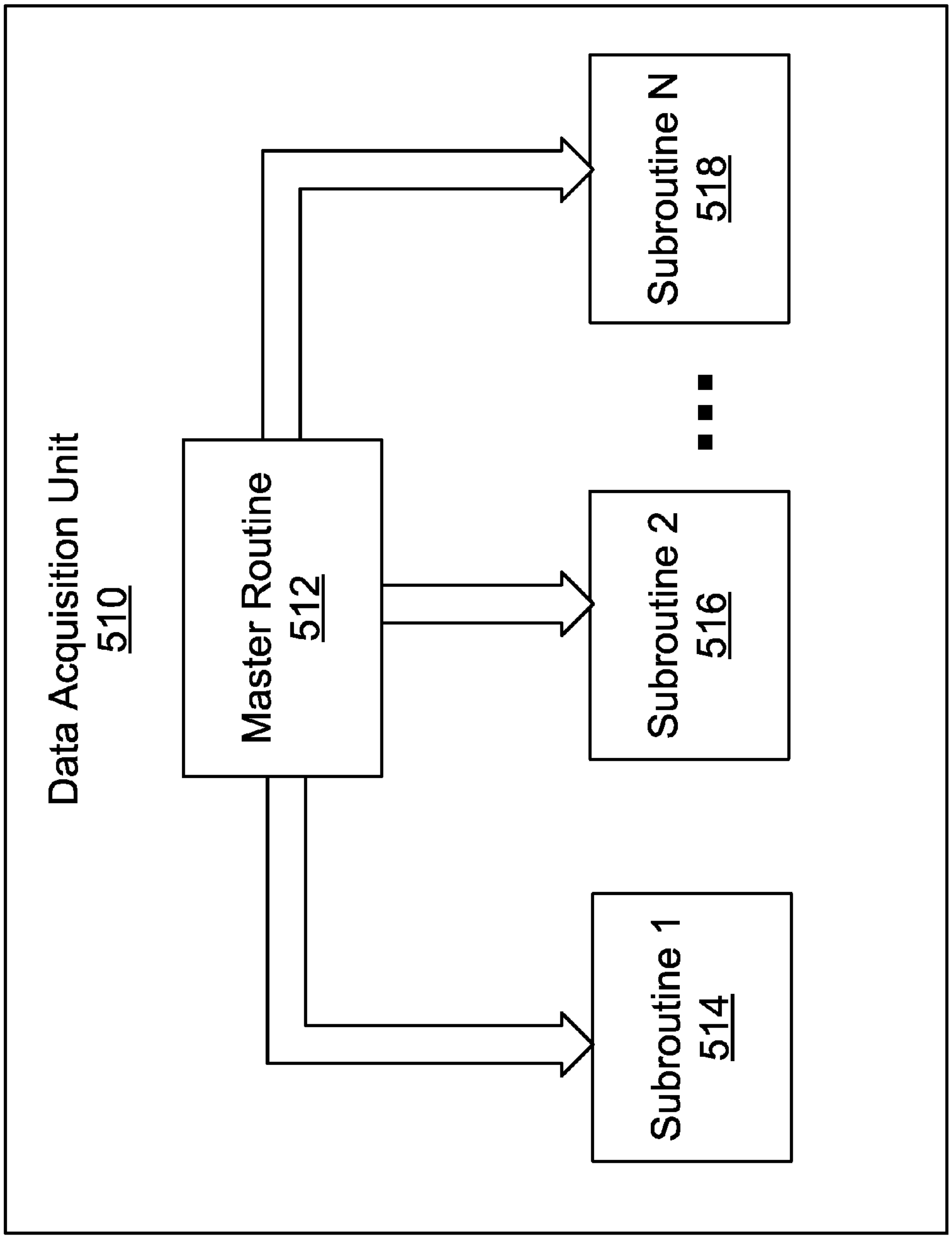

FIGS. 5A and 5B are block diagrams of the Data Acquisition and Control Software 130. The DAC software 130 interfaces with the ATOFMS 110 hardware to control operation of the ATOFMS 110 hardware, acquire data from the ATOFMS 110 hardware, and analyze the acquired data "on-the-fly (real-time)" (as the data is acquired) in real time. The DAC software 130 includes a data acquisition unit 510 and a data processing unit 420. The data acquisition unit 510 is designed to control the various components of the ATOFMS 110 hardware and acquire data from the ATOFMS 110. The data processing unit 520 processes the acquired data for "on-the-fly (real-time)" analysis. All powers, pressures, voltages, etc of the ATOFMS 110 hardware are monitored and controlled by the DAC software 130.

The data acquisition unit 510 is written in LabVIEW® and includes a single master routine 512 which calls multiple subroutines (or sub-VI's) 514, 516, 518. The multiple subroutines (or sub-VI's) 514, 516, 518 include subroutines for the following systems: (1) monitor and control turbo pumps, (2) monitor vacuum gauge pressures, (3) DA boards Acqiris digitizer, (4) control and monitor D/I laser Big Sky laser, (5) monitor laser power meter, (6) control and monitor JDS Uniphase scattering lasers, (7) light scattering/sizing from timing circuit, and (8) a call to the C code signal processing module (data processing unit written in C, C++, etc.) 420 which operates all computational tasks on the signal/data acquired from the ATOFMS 110 for various computationally intensive functions. This signal processing module 520 detects hit particles, saves necessary information, and returns hit and particle type information to the main LabVIEW program (e.g., master routine 512).

Figure 6A:
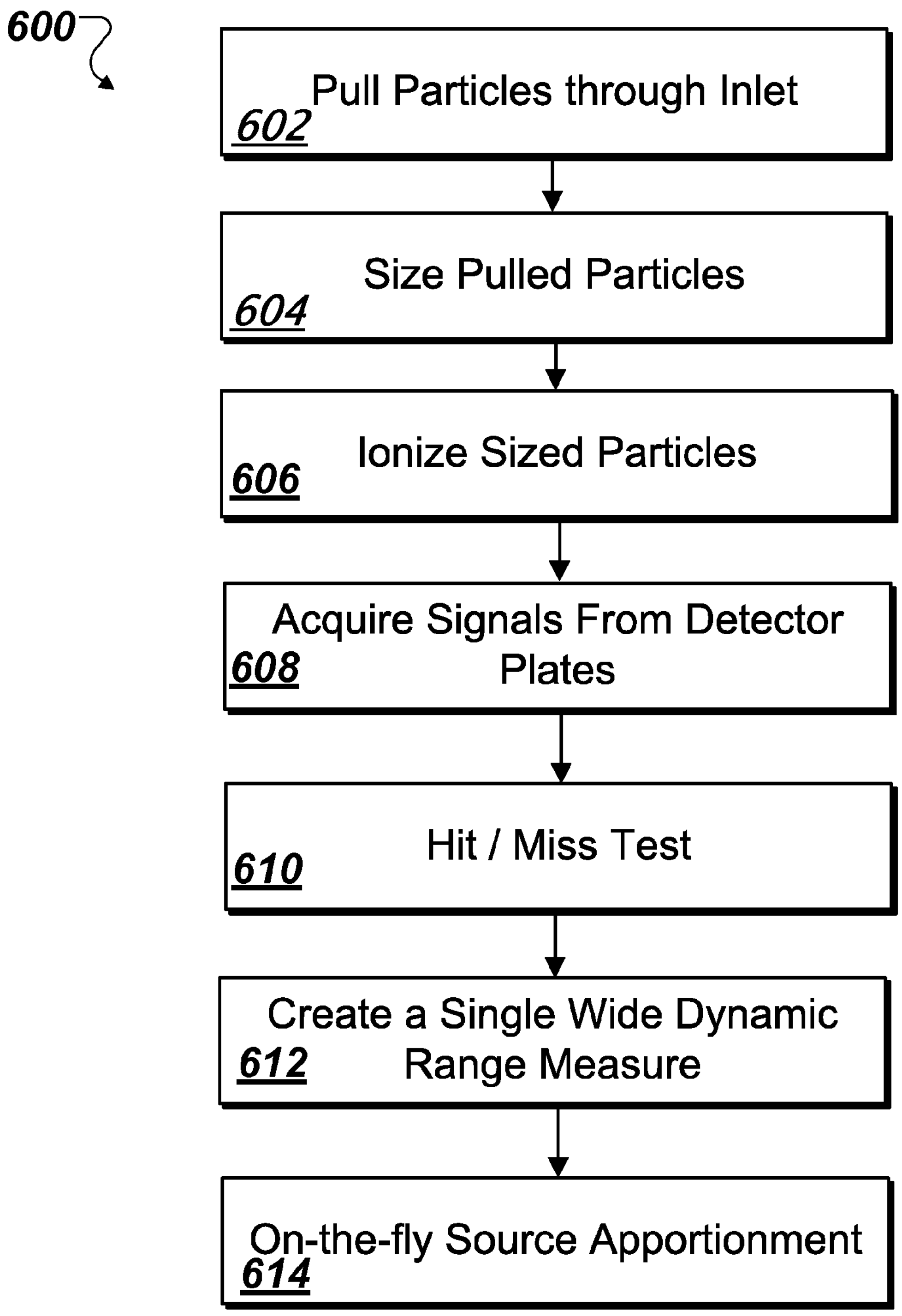
FIGS. 6A, 6B, 6C are process flow diagrams of an example process for sampling particles.
Figure 6B:
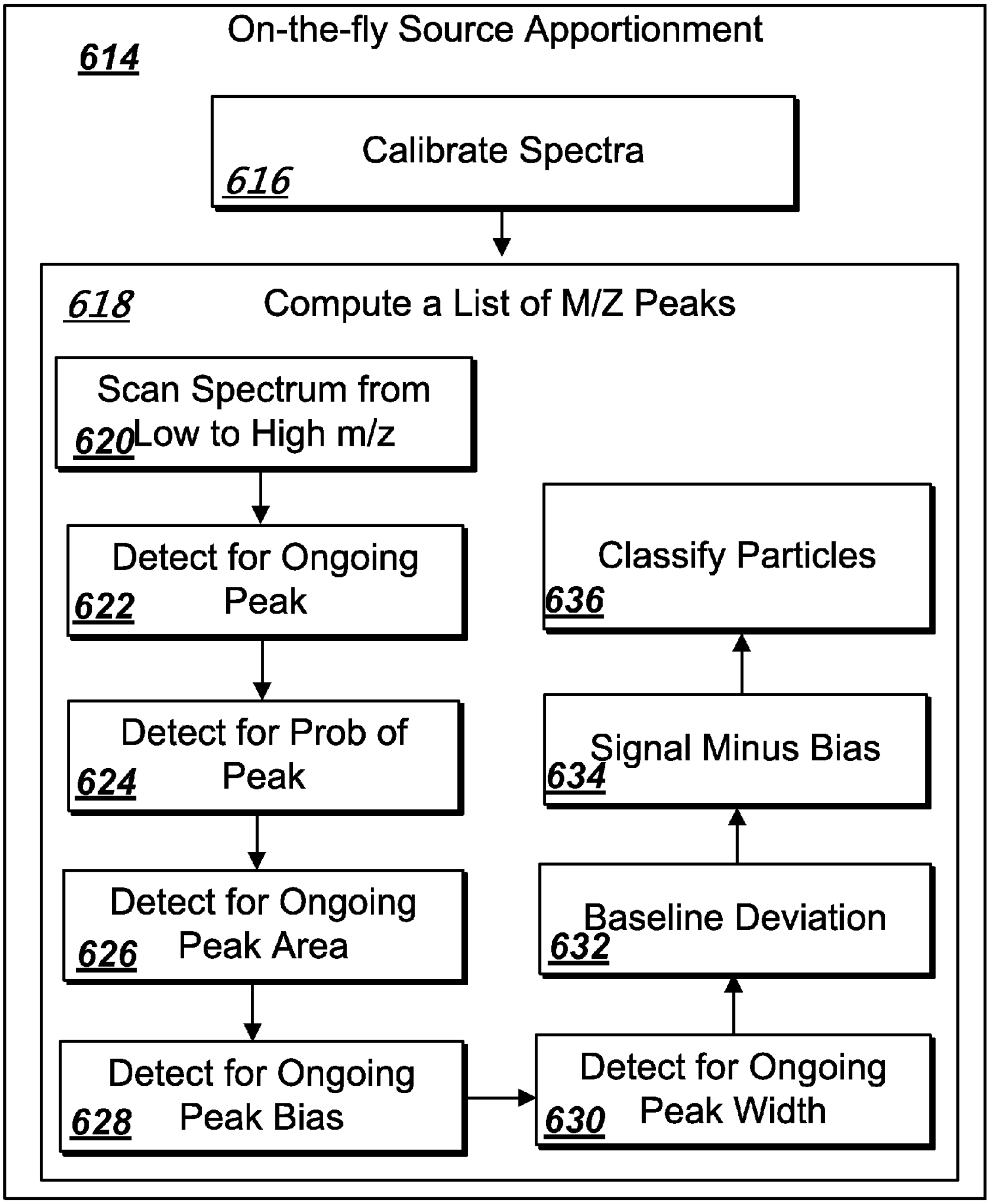
Figure 6C:
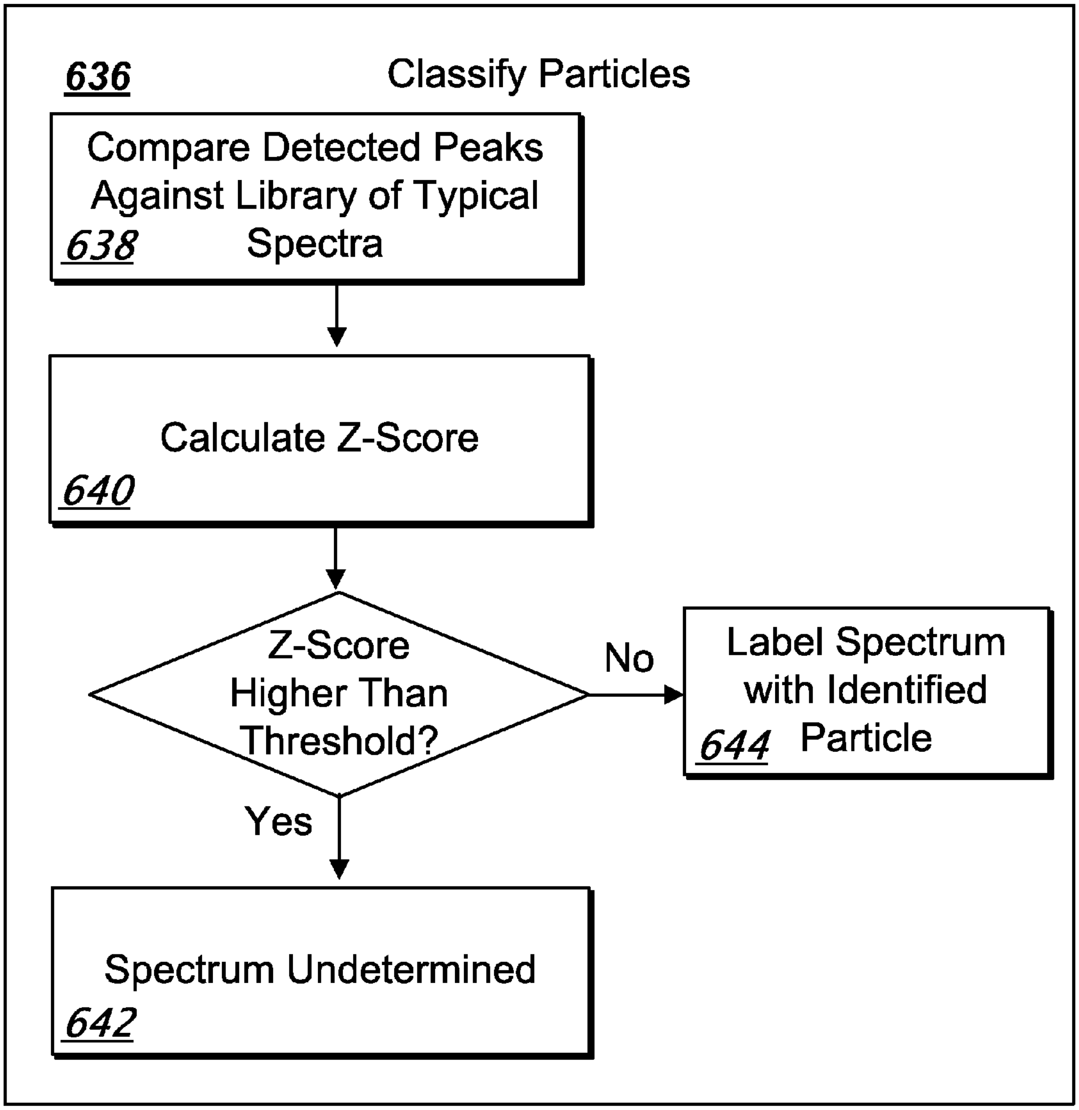

FIGS. 6A, 6B, 6C are process flow diagrams of an example process for sampling particles. Ultra-fine particles are pulled (by vacuum) 602 into the instrument through a differentially pumped inlet. The pulled particles pass through a Po neutralizer (not shown) located upstream of the critical orifice 205 and enables an increased transmission efficiency. The neutralizer enables transmission and detection of smaller particles (Da<200 nm) by reducing lateral deflection caused by high electrostatic gradients in the ion source region of the mass spectrometer. In addition, the aerodynamic lens system 210 enables detection of particles having sizes in the range of 80-3000 (make sizes consistent throughout document) nanometers (nm). For example, a scattering efficiency greater than 30% for particles having sizes in the range of 200-2000 nm can be achieved. In some implementations, the scattering efficiency can approach 100%. In addition, the dome-top interface 220 allows for spherical alignment of the aerodynamic lens system 210, as well as adjustment of the distance between the skimmers 230 and the lens.

The particles entering the inlet are focused through the critical orifice 205 and spacers. As the particles pass through the aerodynamic sizing/scattering region 272, the particles are sized 604 using two orthogonally located scattering lasers mounted into the sides of the sizing region 272. The two scattering lasers 245, 246 are spaced apart a set distance below one another and located orthogonal to another. These scattering lasers 245, 246 are continuous lasers and size the particles as they pass through the scattering region 272. In addition, a special filter amplifier can be used to amplify the scattering signal. Sizing the individual particles includes using the scattering laser 245 located at a higher plane to scatter the laser light off the particles. This scattered light is detected by one of the PMTs 235, 236 designed to convert the scattered light signal to an electrical signal. When the converted electrical signal is detected a timing circuit is activated to start a count-up process. When the same particle passes through the 2nd scattering laser beam 246, the light from the 2nd scattering laser is scattered off the same particle. This second scattering of light off the particle is detected by another photo multiplier tube 235, 236 and another electrical signal is obtained from the scattered light. This signal is sent to the timing circuit to stop the count-up process and reverse the count (i.e., a count down). The count down rate is a function of the comparative distances between that of the scattering lasers 245, 246 and that of the distance from the 2nd scattering laser 246 to the extractor 258. The timing circuit, thereby, yields a measurement of the particles speed, which is indicative of the particle's aerodynamic size.

The sized particles then are desorbed and ionized 606 by the timed firing of a laser desorption/ionization (LDI) laser 250 firing into the center of the ion source of the TOF 258 (ion source region). The timed firing of the DI laser 250 is controlled by the timing circuit. The measurement of the speed of each particle, as provided by the timing circuit, also is used to determine when the particle reach the ion source region, so that the DI laser can be appropriately triggered to direct a high-intensity beam to intersect the particle and desorbs it into its molecular and elemental constituents. This DI laser 250 is aligned through the center of the ion source region 258 in the mass spectrometer region of the instrument.

The two reflectrons 259*a*, 259*b* are each oriented to angularly reflect impinging ions (positive and negatively charged) received from the ion extractor 258 along a reflection path 262, 264 toward a respective ion detector 257a, 257b located near the opposite end of the mass spectrometer chamber 256. To increase the dynamic range, the signals from the microchannel detector plates (of the ion detectors 257a, 247b) are acquired 608 by two digitization boards (not shown), one for the negative ion detector and one for the positive ion detector. Each digitization board has two input channels, one for the unattenuated ion detector signal and the other attenuated by a filter (e.g., a 30 dB filter). A fast-compute baseline is determined 610 as the median rather than the average of the last 100 data points from the unattenuated channel. The fast-compute baseline enables removal of the influence of outliers. The attenuated and unattenuated signals are "stitched" back together by the data processing software. Using the two, attenuated and unattenuated signals enables the system to collect a wide range of ion signals. The small particles are collected through the unattentuated signal and the large particles through the attenuated signal. Thus, a dynamic range of 8000 as opposed to 256 can be achieved.

The signal processing module 520 is designed to decide whether enough/any ions were detected from the DI laser 250 firing to produce a spectrum. The hit/miss test is performed separately on the positive and negative spectra. The hit/miss test, used to indicate whether a sized particle has been hit, involves two different thresholds that can be set independently on each side of a chosen separation. A particle is determined to be hit if there are enough data points either before or after the separation that exceed the fast-compute baseline for the above or below threshold. A lower threshold can be set for higher m/zs that typically don't get peaks as large as the lower m/zs.

When detected that the particle was hit, then the inputs of the attenuated and un-attenuated channels are merged to create 612 a single wide dynamic range mass spectrum that is stored in raw form as a vector One spectrum is created for the negative ions and one spectrum for the positive ions. This is achieved using the two different detectors (one for positive ions an one for negative ions. The vector can include multiple data points obtained at one or more data sampling rates. For example, the vector can include 15,000 points taken every nanosecond. A more accurate signal baseline can be used for wide dynamic range. The signal baseline for the wide dynamic range is computed by averaging all data points in the last 200 that fall inside of the second and third quartiles.

After the computation of the wide dynamic range spectrum, on-the-fly (real-time) source apportionment is performed 614 to immediately identify and classify particles sampled based on source and chemistry. Such on-the-fly (real-time) source apportionment can be useful for identifying plumes during flight, for example. (or detection of biological attacks, or mold, etc.) The signal processing program 520 calibrates spectra 616 and computes 618 the list of m/z peaks in real time for the particles sampled. Calibration is performed using the formula m/z=slope (point #−intercept)$^2$ where the slope and intercept are computed periodically (e.g. weekly). Computation of the slope and intercept can be performed by using least-squares fitting over a set of sample spectra chosen and labeled by the experimenter, for example. The set of sample spectra chosen and labeled can include particles of known sizes. Computation of the slope and intercept can be performed by the signal processing program 520 or using a separate piece of software.

Computing (or detecting) 618 the list of m/z peaks can be performed using the following example algorithm. The spectrum (for the sampled particles) is scanned 620 from low to high m/z. Based on the scan 620, an indicator can be used to record and determine 622 whether an peak ("peak") exists or not ("no peak", initial setting). The peak is detected by examining the full range of signals as described below. Also a determination 624 is made whether an probability of starting a peak, "proba" (initialized at 1) exists. In addition, the signal processing program 520 detects (and monitors) 626, 628, 630 for an peak area (initialized at 0), an peak bias that modifies the baseline (initialized at 0), and an peak width (initialized at 0) respectively.

When detected that the measured spectrum signal presents numerous "up-down" variation, the baseline is modified 632 to account for the variation. The baseline is slowly modified from the initial baseline by averaging the current point with a small weight. The detected "up-down" variations includes a case where over the next N (e.g., 40) sampled points, the signal changes N times with respect to the properties of the signal being strictly increasing followed by strictly decreasing, for example (defaults settings). In the same case, the peak bias is set to a set percentage (e.g. 10%) of the difference between data and baseline. The peak bias is set based on the detected variation in the signal.

In addition to the determination of the peak, a determination 634 is made whether the signal minus the peak bias dips below or above the baseline (or modified baseline). When detected to be below the baseline, the indicator is set to "no peak". In the case where an peak is also detected, the detected peak is recorded with its total area as an independent peak and the peak area reset to zero. Also, the "Proba" value is set to 1.

When detected that the signal minus bias or background is above the baseline and there is no peak, "proba" value is updated by multiplying by the probability associated with the observed signal assuming a Gaussian distribution of signal noise. When the "proba" value is detected to dips below a set threshold (e.g. $10^{-7}$) the following are performed: (1) an indicator is set to "peak"; (2) the peak area is set to the value of the signal minus baseline; (3) peak width is set to 1; and (4) the bias is set to half the difference between baseline and data.

Once the above detections and decisions have been made, the DAC software 130 can save the peak list directly. The DAC software 130 also summarizes the peak list into a vector Area=f(m/z) and can save that table directly as well.

From the extracted peak list, the A-ATOFMS 110 can classify the particle into one of several (e.g., 7-10) predefined types through comparison 636 with a library of typical spectra created from millions of spectra sampled from specific sources as well as the ambient atmosphere. This library contains the information from ambient studies as well as studies focused on emissions from specific sources (coal, biomass burning, cars, diesel trucks, biological particles, dust, sea spray, vegetative detritus, brake dust, pollen, bacteria, for example). The library is designed to describe each known source sampled as a collection of a several typical "mass spectral fingerprints" with associated variability.

FIG. 6C is a process flow diagram illustrating an example process for performing the classification 636. Comparisons 638 are made by choosing the entry that gets the lowest Z score when compared with the data vector. The Z-score is obtained 640 by scaling the entry "diameter", or a dot product between the vector of square roots of the entry peak areas with the square roots of the data vector. A determination 640 is made whether the lowest Z-score is higher than a user-chose "acceptable threshold" value. When detected that the lowest Z-score is higher than a user-chosen "acceptance threshold", the spectrum is labeled 642 as "undetermined", and the sampled particle is not classified. Otherwise, the spectrum is labeled 644 with the particle type associated with the entry (there can be several library entries per particle type). This last feature allows determination of the sources of aerosols in the air in real-time.

The source library contains seeds for various specific sources including: (1) gasoline powered light duty vehicles (LDV), (2) heavy duty diesel vehicles (HDDV), (3) biomass burning, (4) dust, (5) sea salt, (6) meat cooking, and (7) industrial emissions as described above. Other possible categories for seeds of general particle types include: (8) elemental carbon (EC), (9) aged organic carbon (aged OC), (10) aged elemental carbon (aged EC), (11) amines, (12) Polycyclic aromatic hydrocarbons (PAH's), (13) vanadium containing, and (14) ammonium ($NH_4^+$) containing, (15) pollen and other biological particles, (16) single cells such as cancer cells. These additional categories are provided to cover particles that may not match into any of the seven specific sources. Further, other categories can be added depending on the source particles sampled. In some implementations, the library can include spectral fingerprints for biological materials and cells, such as single cancer cells. In addition, the spectral fingerprints of the cancer cells can include spectral fingerprints for each different metastasized stages of cancer mutation. By having the spectral fingerprints of various single cancer cells and at different stages, medical practitioners can identify and target the cancer cells at all stages of cancer for effective treatment (pharmacological targets, for example.).

The source specific seeds are obtained from both laboratory and ambient ATOFMS studies. For example, the HDDV and LDV clusters are generated from data acquired from dynamometer studies as well as from a freeway-side study. Likewise, the dust source signatures can be obtained from lab studies of resuspended dust and soil collected from around the world, as well as from dust particle classes detected from various ATOFMS studies around the world in other locations. The sea salt, industrial, and non-source specific seeds can be generated exclusively from particle classes detected from ATOFMS ambient studies. Among the vast amount of specific sources are included in the library, the particle types included in the library represent major particle types found in urban, city, marine, and rural areas. In addition, the library is adaptive and can be designed to have more source signatures added to it as future source characterization and ambient studies are conducted. Such sources include a variety of industrial emissions, coal combustion, and cigarette smoking, as well as increasing the detail of the vehicle source seeds with more aged vehicular particle types.

The source library is tested on multiple ATOFMS instruments in order to insure that the library can be universally applied for the ATOFMS community. New source spectra can be added to the library or even have ones removed if they are found to interfere with proper apportionment.

The signal processing module 520 operates all computational tasks on the signal. It detects hit particles, saves necessary information, and returns hit and particle type information to the main LabVIEW program. When the on-the-fly (real-time) apportionment is in use, the main control panel shows a histogram of the particle types, which is periodically reset. To maximize speed of the software, display of sections can be selectively turned off to increase data acquisition rate.

Figure 7:
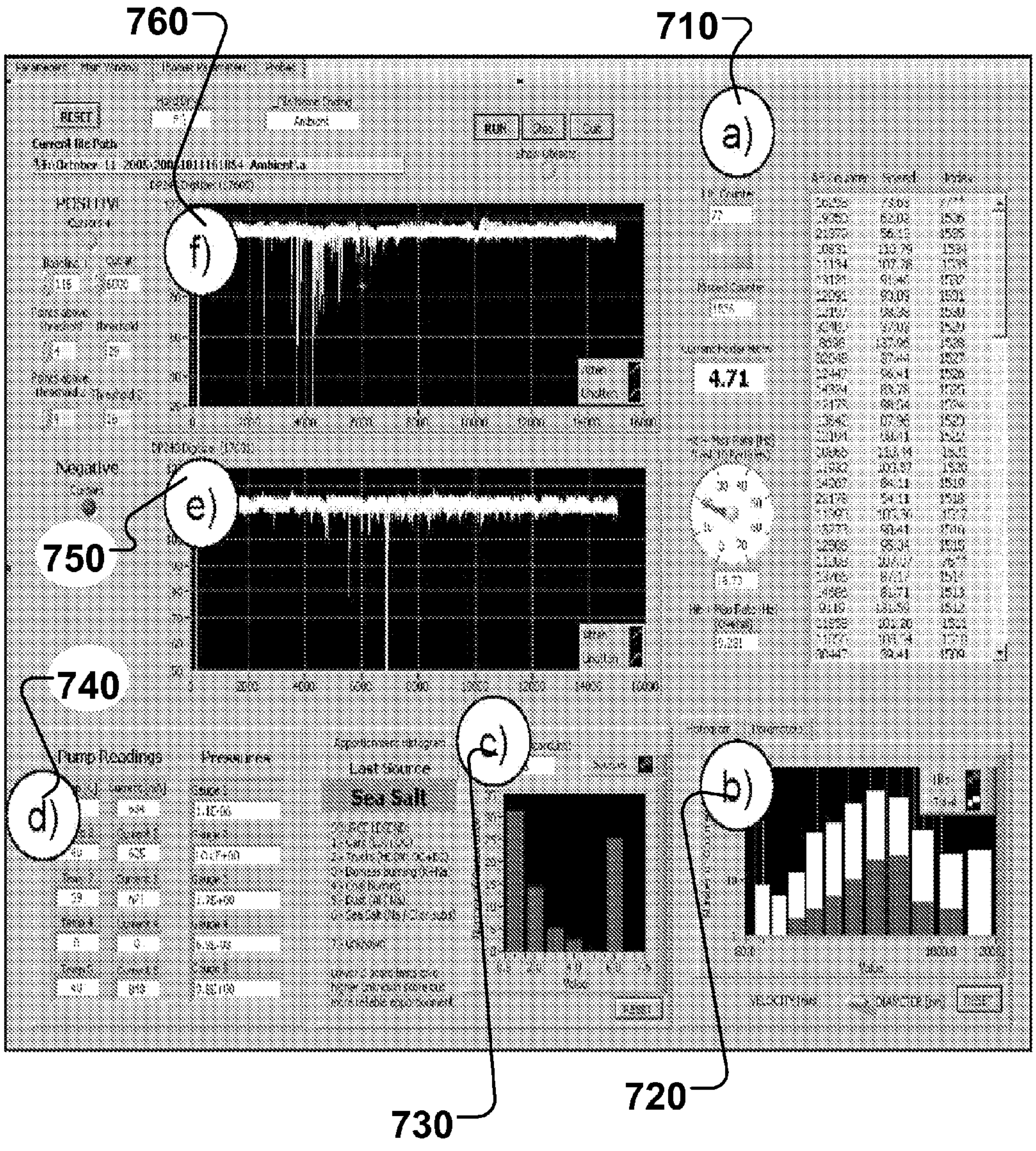
FIG. 7 is a screenshot of the software that provides on a single screen displaying various real-time information for sized particles, hit particles, and instrument status.

The instrument control and monitoring software 130 displays a wealth of real-time information from detected particles and current instrument operating status such as vacuum pump and pressure monitoring. FIG. 7 is a screenshot of the software 130 that provides on a single screen various real-time information for sized particles, hit particles, and instrument status. For sized particles the following data 710 are displayed and recorded: the timer counter number, particle speed, and particle index number. Additionally, a display of the total number of sized particles without mass spectra, and a histogram of the particle speed, or size distribution for the total number of particles are provided 720. For hit particles, those both sized and with a mass spectrum, the following additional information 760, 750 is recorded and displayed: positive and negative mass spectra, both unattenuated and attenuated signals. Also displayed is the hit counter, a histogram of hit particle speed, or size 720, the percentage of particles hit versus total particles analyzed in the current folder (resets every 500 hit particles), total scatter rate for the last ten particles and over, where the total scatter rate is defined as the hit and miss rate. Optionally, a real-time calibration and source apportionment can be performed and displayed as a histogram of the different particle types detected 730.

The custom developed user friendly software 130 enables user customization of tasks performed depending on the application. The software 130 can be run in several settings, depending on the level of information display desired and maximum achievable data rate required. For example, when configured for maximum data acquisition rate, tests show 33.5 ms is required to detect, read, and save a particle, resulting in a maximum data acquisition rate of 30 Hz. Testing of software performance on the maximum data rate with all tasks operative, including writing peak lists, on-the-fly (real-time) apportionment, and all screen options displayed, shows that 120 ms are required per hit particle, giving a maximum rate of 8.3 Hz. Typical performance on ambient conditions with the software 130 in maximum data acquisition rate mode (minimized display, no light scattering monitoring, no on-the-fly (real-time) apportionment) results in a data acquisition rate of ~6 Hz. This is approximately 10 times greater data acquisition rate than the ~2 Hz of the previous nozzle-inlet ATOFMS and UF-ATOFMS. For example, data acquisition can be performed at 1-2 Hz on the older, conventional instruments while the system as described in this specification can run data acquisition at up to 20 Hz. The observed sustained rate of 6 Hz is lower than the maximum theoretical rate, because the particles are not ideally spaced, and there is some waiting time between completion of the computational tasks and the arrival of the next particle's scattering signal. Subsequent laboratory measurements have shown data rates of >10 Hz, and with further optimization up to 50 Hz in ambient conditions can be achieved. In some implementations, with the addition of new LDI lasers, the system as described in this specification can operate at up to kHz rep rates to allow high throughput analysis of, for example, single cells to conducted single cell proteomics and pre-cancer screening.

For sized particles, the software 130 checks to see if there is a mass spectrum, if not, it saves the counter number, speed, and time. If there is a mass spectrum (hit), then it saves the above information, plus dual polarity mass spectra and laser power. The instrument status information also displayed is the turbo molecular pump temperature, current, and pressure monitoring for the five pressure regions 740. The turbo molecular pump status is read and written to a file once every 10 seconds, and the pressures are read and recorded at 1 Hz. The combination of new software and computer provide a simple, easy to use interface and >3 times improvement over previous ATOFMS of sustained data acquisition rate of 12-15 Hz for example. In some implementations, up to 20 Hz can be achieved.

The ATOFMS 110 as described in this specification enables improved scattering efficiency (Es). Standard PSL particles can be used to characterize the sizing and detection efficiency of the aerodynamic lens system 210. The scattering efficiency is defined as the ratio of the number of particles detected in the sizing region per unit time (particles*minute−1) to the total number of particles entering the aerodynamic lens system 210 during the same time period (Equation 1)

$$Es=Ns/CQI \quad (1)$$

The value, C is the number concentration as measured by the condensation particle counter (CPC Model 3010, TSI Inc., MN) or aerodynamic particle sizer (APS) spectrometer (Model 3321, TSI Inc., MN) (particles*cm−3) and the value QI is the volumetric flow rate (cm3*minute−1) of the inlet system. For example, PSLs 120 nm≤Da≤2920 nm can be used for the transmission efficiency experiments. Total particle concentration is measured simultaneously on the excess flow after the tee above the A-ATOFMS inlet using a CPC for particle less than 1.4 μm and an APS for PSL sizes greater than 1.4 μm.

To increase the detection of smaller particles (<200 nm), a neutralizer (not shown) can be added to the inlet to extend the lowest detectable size from 200 nm to 70 nm. The neutralizer can be added when a large deflections (e.g. 0.80 mm) are observed in the source region for 170 nm PSL particles after passing through a DMA without neutralizer versus with a neutralizer. This deflection is due to the high electric field strength between the extraction plates. The electric field strength is approximately 4 times higher than previous instruments, a result of the ~2 times higher voltage applied and half the extractor plate separation distance. This observed deflection increases for smaller sized particles and therefore decreases the detection efficiency for these small particles.

Figure 8:
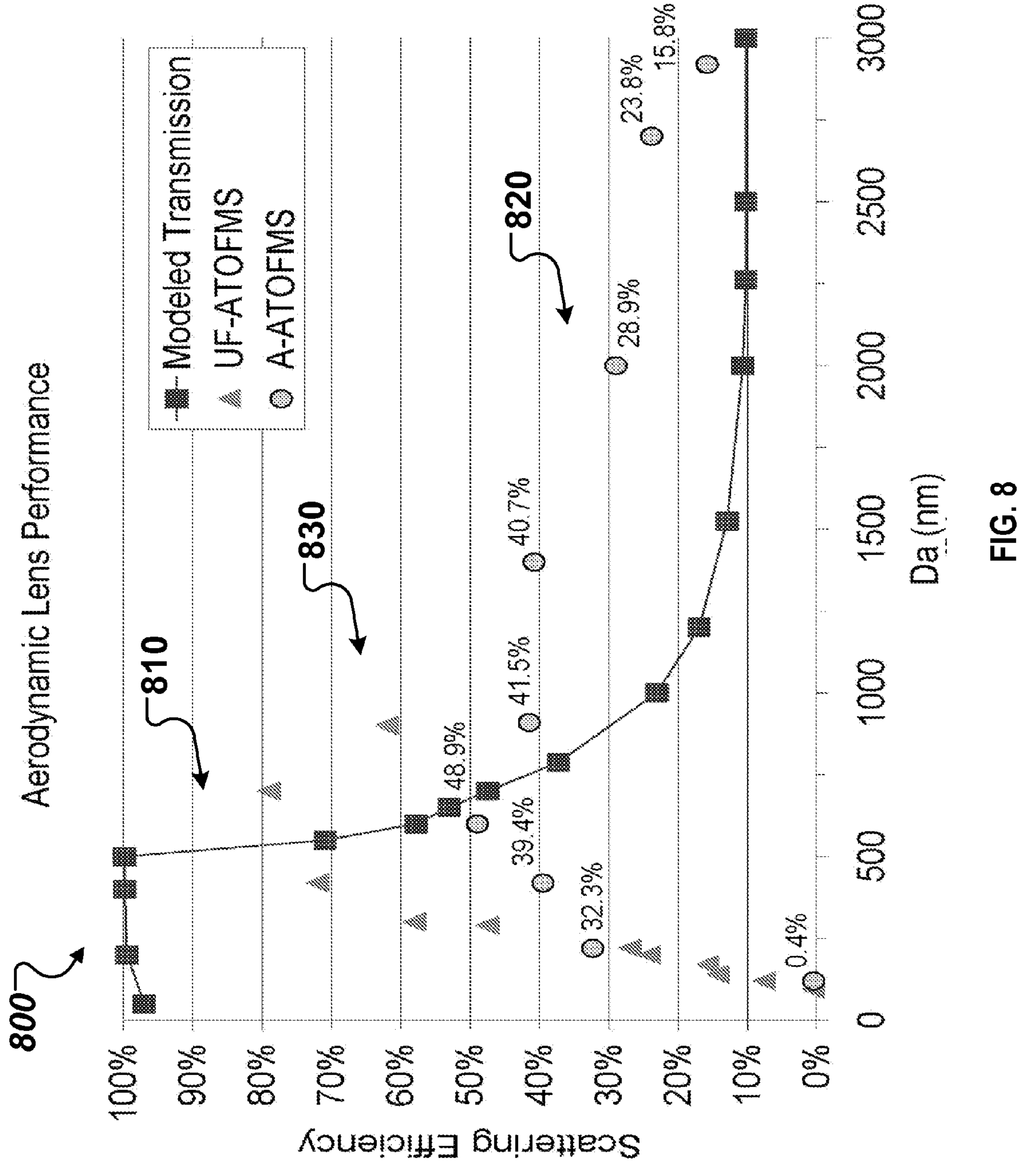
FIG. 8 shows various particle size transmission curves through the aerodynamic lens.

FIG. 8 shows various particle transmission curves. Modeled transmission performance 810 (solid line curve) is shown in comparison to A-ATOFMS transmission performance 820 (data points in filled-circles) and UF-ATOFMS transmission performance 830 (data points in filled triangles). The A-ATOFMS aerodynamic lens system 210 had a maximum scattering efficiency of 48.9% at 600 nm and ranged from 0.4-15.8% for 120-2920 nm PSL particles. The transmission performance for the A-ATOFMS aerodynamic lens system 210 is greater than 29% over the 220-2000 nm size range. For the aerodynamic lens of the UF-ATOFMS, the scattering efficiency 830 of this aerodynamic lens system over the size range of 95-700 nm was 0.5-62%. The difference between the two experimental curves may result from a difference in tuning. The A-ATOFMS curve was generated from a fixed tuning position, i.e. the system was set to a good overall position, and not optimized for a single particle size.

The modeled transmission performance 810 is obtained based on the simulation program. The modeled total transmission 810 is above 97% for particles 50-500 nm and falls off sharply to ~10% for particles larger than 500 nm. Because the Es is a convolution of total transmission and scattering detection, the expected result is a lower value, especially for the smaller sizes (<100 nm). However, the observed transmission is greater than simulations for sizes larger than 700 nm.

Figure 9:
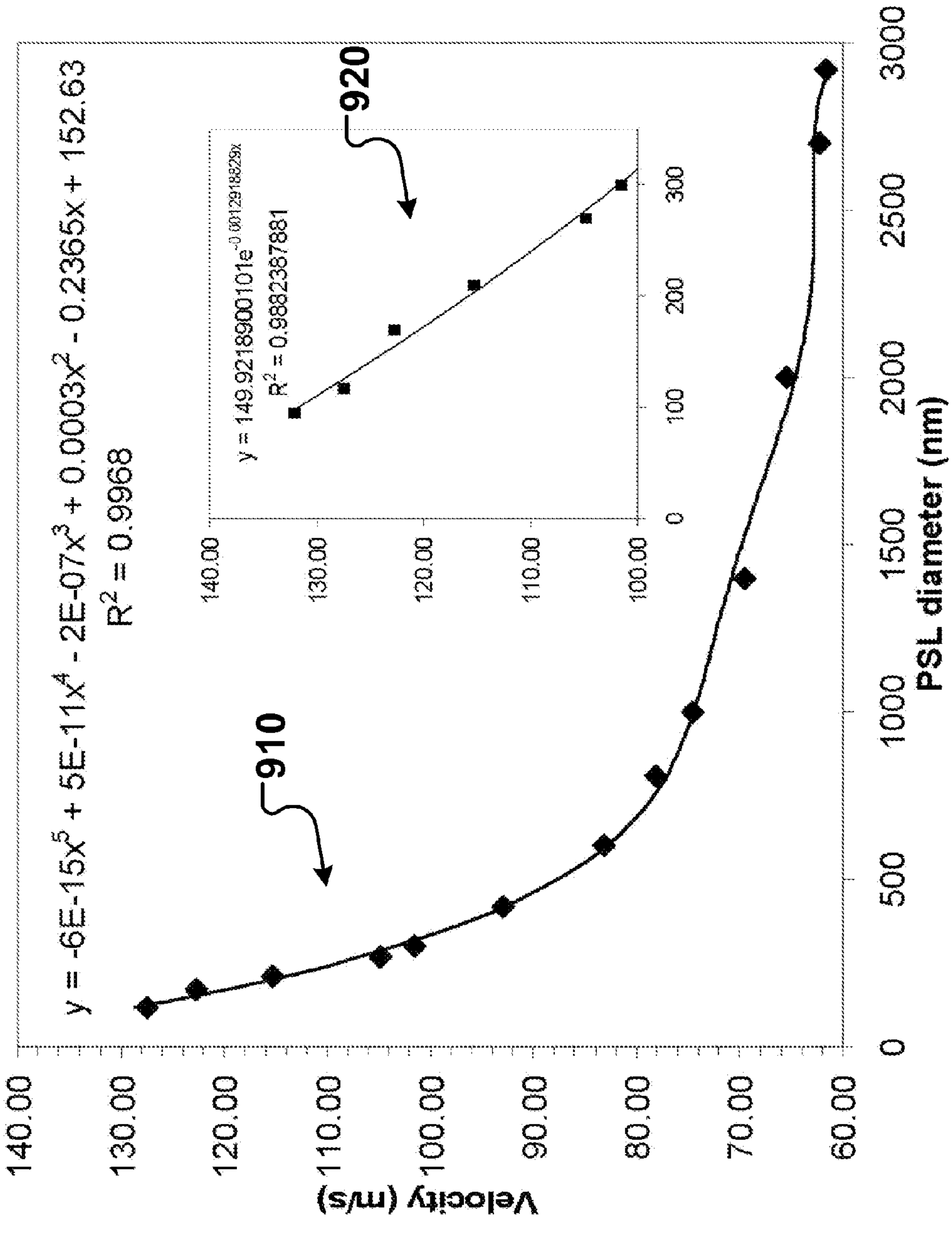
FIG. 9 shows a size calibration curve.

FIG. 9 shows a size calibration curve 910. PSLs between 95 nm and 2920 nm were used to generate the size calibration curve 910. A fifth order polynomial (R2 0.9996) is fit to the size calibration data to provide high resolution size data for 100 nm≤Da≤3000 nm particles. For particles below 100 nm, a power curve (R2 0.95) fit to PSLs in the 95 to 300 nm range provides a better fit than the polynomial, and the power curve fit can be extrapolated down to 70 nm. This power curve is shown in the inset 920 of FIG. 9. Ambient particles as small as 70 nm and as large as 3000 nm were detected in Riverside, Calif. during SOAR.

In some implementations, the compact Z-TOF configuration is designed to increase ion transmission and mass range while minimizing the footprint of the MS by folding the ion flight path and maintaining the dual polarity ion collection. A realistic simulations of complex geometries; further, custom geometry optimization enables automated variations of electrode geometry to optimize ion collection and mass resolution. The mass resolution R, is defined using Equation 2.

$$R=t/2\Delta t \quad (2)$$

In Equation (2), t is the average ion flight time, and 2Δt is the FWHM of the peak. The mass resolution is highly dependent upon the initial ion parameters, such as spatial distribution and starting kinetic energies.

To ensure sufficiently high resolving power of the Z-TOF, realistic initial ion populations can be determined by first modeling the coaxial TOF MS, used in the previous generation (or conventional) ATOFMS instrument, and using ion populations which corresponded with observed mass resolution. For example, particles were simulated with an aerosol initial velocity 150 m/s, and an ion plume velocity of 1250 m/s for m/z 100 Daltons. Results from the ion simulations indicate a mass resolution of 600 at m/z 100, a mass range of 5000, and 100% ion transmission for m/z<2000 Daltons. The resolution improves further with higher masses, reaching a maximum of 1000 for m/z 300 and above. Based on ion simulations, the previous coaxial design yielded a R of 230 at 100 m/z and 41% ion transmission using the same ion population (m/z 100).

In some implementations, the A-ATOFMS 110 as described in this specification can be implemented to be operational in an aircraft. Typical observed ion flight times are ~7 μs for m/z 100 Daltons. For 270 nm PSL particles, typical mass resolutions at m/z 100 are 500 for positive ions and 800 for negative ions, although R can be greater than 1000 (1500) for positive (negative) ions. The lower R value for the positive ions may be due to the increased number of positive ions leading to space charge effects. To compare the observed performance of the Z-TOF MS with the previous ATOFMS coaxial mass spectrometers, standard 270 nm PSL particles were analyzed. The previous design yields a R of 500 for both positive and negative ions. Thus the Z-TOF has the same or better mass resolving power than the coaxial design even though the flight times are much shorter, and the ion transmission rate is enhanced as well. The increased ion transmission enables new insights into ambient particle chemistry, by allowing the detection of oligomeric species from m/z −200 to −400 during SOAR43. Importantly, it will also allow better distinction between bioaerosols by allowing detection of higher molecular weight proteins in the upper m/z range.

Figure 10:
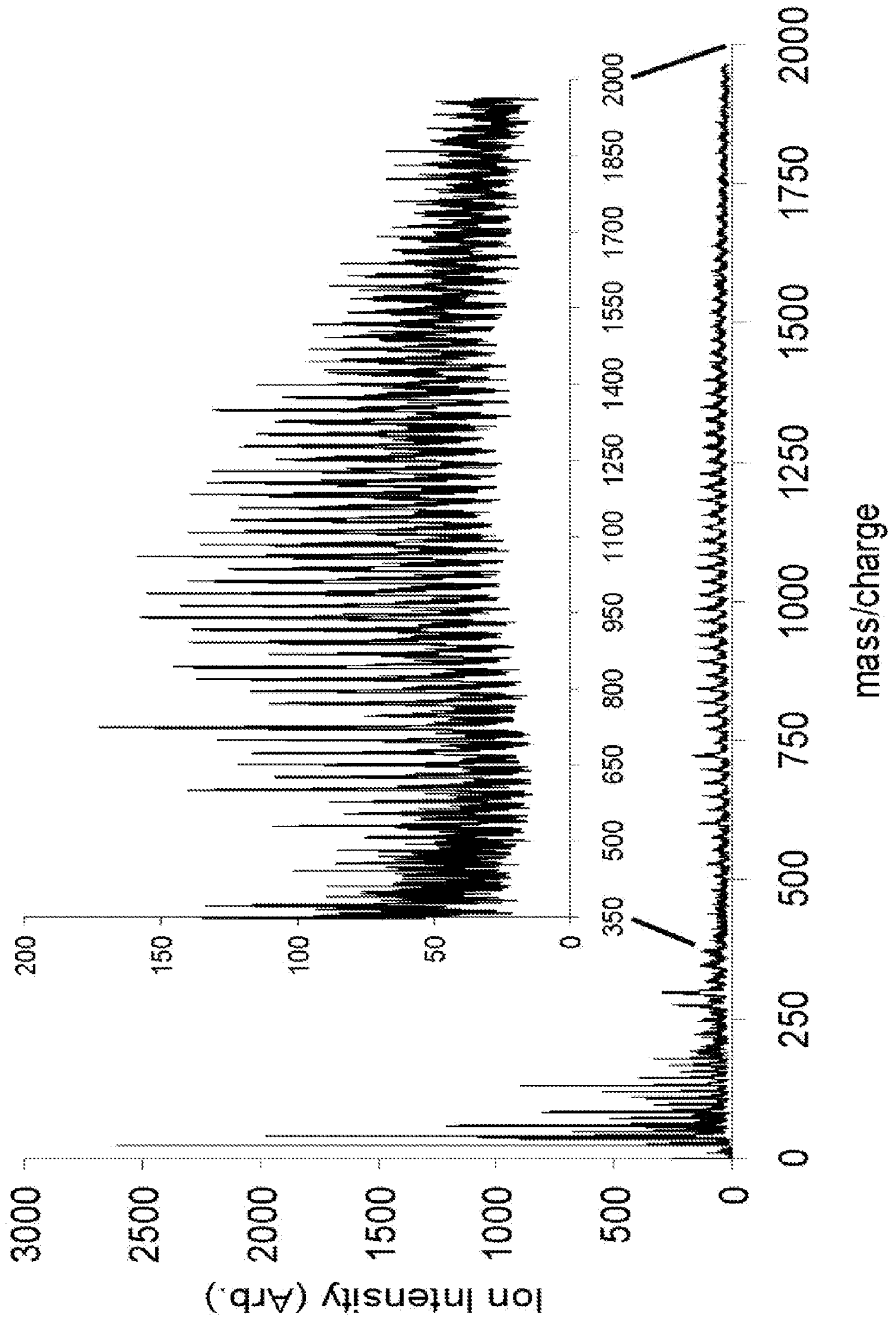
FIG. 10 illustrates the higher mass/charge range as an example of the performance of the new A-ATOFMS.

In some implementations, the A-ATOFMS 110 as described in this specification can enable detection of high molecular weight molecules in atmospheric aerosol particles, including biological particles. FIG. 10 illustrates the mass range of the ATOFMS 110. A higher mass range for the ATOFMS 110 as described in this specification is shown in FIG. 10. The raw mass spectrum is shown from the detection of a 270 nm aerodynamic diameter particle sampled with positive ions detected out to approximately m/z 1960. The higher mass range of the ATOFMS 110 as described in this specification enables such detection of ions beyond previous limit of only 350 m/z.

The A-ATOFMS 110 as describe in this specification can be implemented for variety of applications. For example, the A-ATOFMS 110 can be modified and packaged into a standard dual 19" wide instrument rack for initial flight-based measurements aboard an aircraft (e.g., The National Center for Atmospheric Research Earth Observing Laboratory's C-130 aircraft). Power and weight reductions can be achieved through the consolidation of electronics and power supplies and machining to lighten existing components. The control software can be extended to fully automate the operation of the A-ATOFMS 110, data acquisition from the A-ATOFMS 110 and data analysis (on-the-fly source apportionment). In addition, the aerodynamic lens system 210 can be modified to extend the transmission efficiency for particles across a broader size range (e.g. from 100-2500 nm). In addition, a fixed inlet housing can be incorporated to maintain particle beam alignment under harsh operating conditions. Further, the design of the system 100 and the A-ATOFMS 110 can be modified to reduce the power consumption to <1 kW and weight <114 kg and increase the data acquisition rate to greater than 10 Hz.

The A-ATOFMS 110 as described in this specification implements a high mass range compact Z-TOF and high speed on-the-fly (real-time) apportionment software. Such a device and system represents a single particle instrument designed for flight that is able to measure polydisperse aerosol with simultaneous bipolar ion detection. The ATOFMS 110 is able to sample ambient particles having aerodynamic diameters between 70-3000 nm, and perform chemical analysis with a mass range of up to 1960 amu. Improved data acquisition software 130 enables a sampling rate three times greater (6 Hz) than previous generations of ATOFMS. In addition, ambient measurements with analysis rate of 20 Hz can be achieved to enable mobile platform applications such as in-aircraft operation to improve statistics of data and allow detection of brief events or plumes. The dual polarity mass spectrometer can also assist in identifying particle aging and secondary species, as chemically different and unique information is contained in the positive and negative ion mass spectra.

The A-ATOFMS 110 as described in this specification adds powerful new capabilities in a smaller package compared to earlier versions. In particular, the mass spectrometer design improves ion transmission over a greater mass range while having a smaller foot-print. The interface software 130 is faster and easier to use, and it adds the capability of classifying particles in real time, which can be useful in detecting and identifying plumes during flights, among others.

Figure 11:
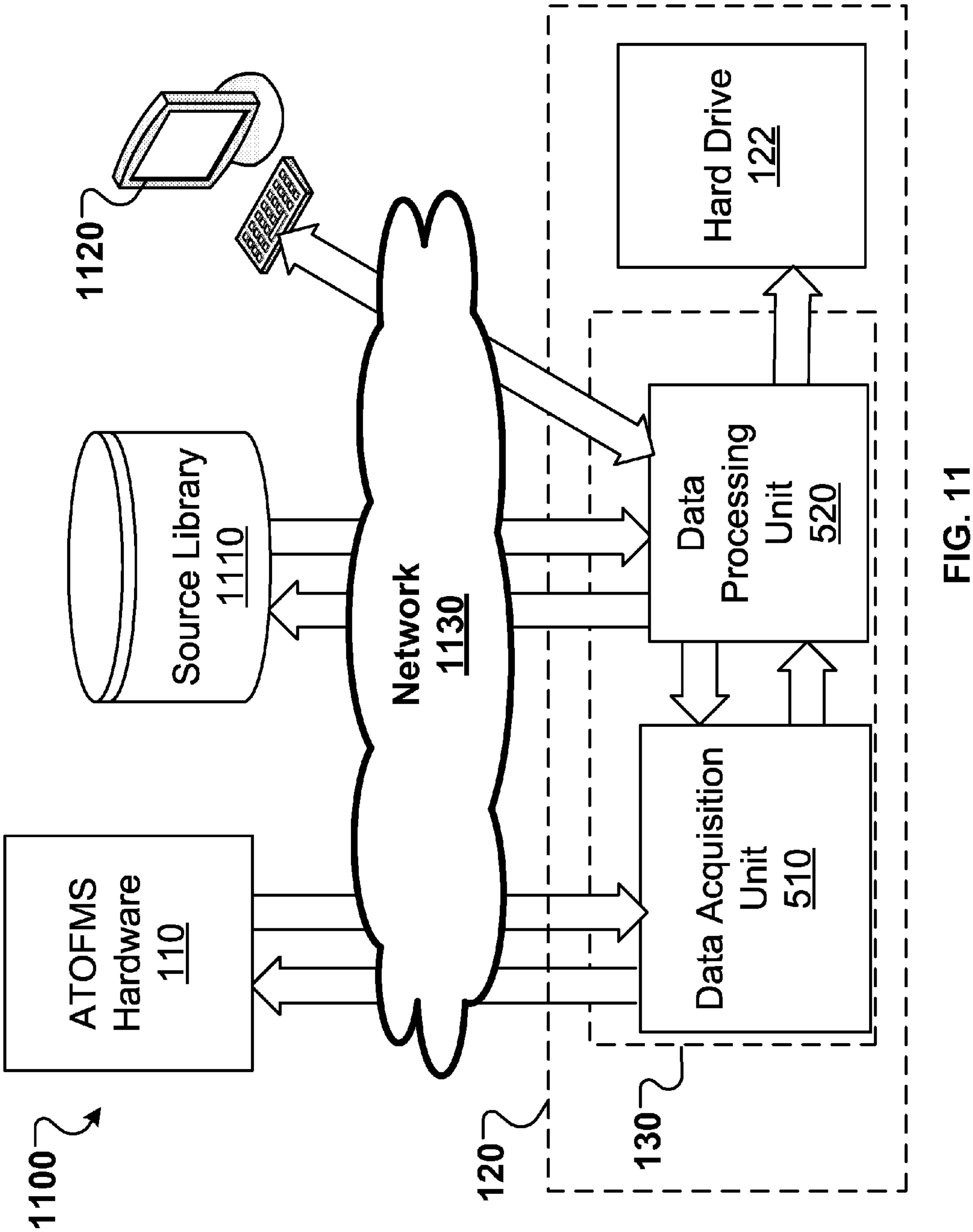
FIG. 11 is a block diagram of a system for operating an example ATOFMS device operating autonomously at a remote location.

FIG. 11 is a block diagram of a system 1100 for operating the ATOFMS 110 device at a remote location. The system 1100 includes the system control hardware 120 interfacing with the ATOFMS 110 device (hardware) over a network connection 1130 such as the internet. In addition, a source library 1110 that includes the library of typical source spectra can be located at a remote location. The remote source library 1110 can interface with the system control hardware 120 to enable "on-the-fly (real-time)" source apportionment. Further, a remote computing system 1120 can be connected to the system control hardware 120 over the network connection 1130 to obtain acquired data and the results of the "on-the-fly (real-time)" source apportionment. Also, the operator at the remote computing system 1120 can control the operation of the ATOFMS 110 device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks;

and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A computer implemented method for real-time classification of particles in a sample comprising:

acquiring a first signal from a first ion detector associated with positive ions of a particle, wherein the first signal comprises an attenuated signal and an unattentuated signal associated with the positive ions;

acquiring a second signal from a second ion detector associate with negative ions of the particle, wherein the second signal comprises an attenuated signal and an unattenuated signal associated with the negative ions;

analyzing the acquired first and second signals to detect whether enough positive and negative ions are detected to form a spectrum associated with the particle;

when enough positive and negative ions are detected to form a spectrum, merging the attenuated and unattenuated signals associated with the positive ions to generate a first wide dynamic range measure, and merging the attenuated and unattenuated signals associated with the negative ions to generate a second wide dynamic range measure;

computing a list of m/z peaks based on the generated first and second wide dynamic range measures; and comparing the computed list of m/z peaks to a library of known mass spectral fingerprints to classify the particle.

2. The method of claim 1, wherein acquiring the first and second signals comprises acquiring the signals in real-time.

3. The method of claim 1, wherein comparing the computed list of m/z peaks with a library of known mass spectral fingerprints comprises making the comparison in real-time to classify the particle.

4. The method of claim 1, further comprising calculating a baseline signal.

5. The method of claim 4, wherein computing a list of peaks comprises detecting at least one of:

a peak;

a probability of starting a peak;

a peak area;

a peak bias that modifies the baseline; and a peak width.

6. The method of claim 5, further comprising:

subtracting the peak bias from the generated wide dynamic range measures; and detecting whether the subtracted signal falls above or below the baseline.

7. The method of claim 1, further comprising storing the list of m/z peaks as a vector.

8. The method of claim 7, wherein comparing the computed list of m/z peaks to a library of known mass spectral fingerprints to classify the particle comprises choosing an entry from the library that provides the lowest Z-score when compared with the vector, wherein calculating a Z-score comprises performing a dot product between square roots of the entry peak areas with the square roots of the vector.

9. The method of claim 8, further comprising:

when detected that the lowest Z-score is higher than a threshold value, identifying the particle as undefined; and when detected that the lowest Z-score is lower than or equal to the threshold value, identifying the particle as a source particle associated with the lowest Z-score.

10. The method of claim 1, wherein comparing the computed list of m/z peaks to a library of known mass spectral fingerprints comprises comparing to an adaptable library that includes sources or particles from indoor or outdoor environment.

11. The method of claim 1, wherein comparing the computed list of m/z peaks to a library of known mass spectral fingerprints comprises comparing to an adaptable library that includes sources or particles that includes at least one of mold, dust, pollen, bacteria, sea salt, coal, biomass burning, cars, diesel trucks, biological particles, dust, sea spray, vegetative detritus, and brake dust.

12. The method of claim 1, wherein comparing the computed list of m/z peaks to a library of known mass spectral fingerprints comprises comparing to an adaptable library that includes sources or particles from at least one of ambient air or and emissions from specific sources.

13. The method of claim 1, wherein comparing the computed list of m/z peaks to a library of known mass spectral fingerprints comprises comparing to the library that is adaptable to describe each known source sampled as a collection of a few typical spectra with associated variability.

14. The method of claim 1, wherein comparing the computed list of m/z peaks to a library of known mass spectral fingerprints comprises comparing to the library that is adaptable to include categories of general particle types that include at least one of elemental carbon, aged organic carbon, aged elemental carbon, amines, polycyclic aromatic hydrocarbons, vanadium containing source, and ammonium containing source.

15. The method of claim 1, wherein comparing the computed list of m/z peaks to a library of known mass spectral fingerprints comprises comparing to the library that is adaptable to include changes in sources due to aging.

16. The method of claim 1, wherein comparing the computed list of m/z peaks to a library of known mass spectral fingerprints comprises comparing to the library that is adaptable to add or remove new source spectra when detected to interfere with proper classification of the particle.

17. A system for real-time classification of particles in a sample, the method comprising:

a database to store updatable library of known mass spectral fingerprints;

a data acquisition unit to acquire spectrum data associated with a particle in real-time; and a data processing unit connected to the data acquisition unit and the database to analyze the acquired spectrum data to classify the particle in real-time, wherein, the analyzing comprises comparing the acquired spectrum data to the library of known mass spectral fingerprints stored in the database to obtain a match, wherein the data processing unit is configured to add or remove new source spectra into the library stored in the database when detected to interfere with proper classification of the particle.

18. The system of claim 17, wherein the data processing unit is configured to compare the computed list of m/z peaks to an adaptable library of known mass spectral fingerprints that includes sources or particles from indoor or outdoor environment.

19. The system of claim 17, wherein the data processing unit is configured to compare the computed list of m/z peaks to an adaptable library that includes sources or particles that includes at least one of mold, dust, pollen, bacteria, sea salt, coal, biomass burning, cars, diesel trucks, biological particles, dust, sea spray, vegetative detritus, and brake dust.

20. The system of claim 17, wherein the data processing unit is configured to compare the computed list of m/z peaks to an adaptable library that includes sources or particles from at least one of ambient air or and emissions from specific sources.

21. The system of claim 17, wherein the data processing unit is configured to compare the computed list of m/z peaks to the library that is adaptable to describe each known source sampled as a collection of a few typical spectra with associated variability.

22. The system of claim 17, wherein the data processing unit is configured to compare the computed list of m/z peaks to the library that is adaptable to include categories of general particle types that include at least one of elemental carbon, aged organic carbon, aged elemental carbon, amines, polycyclic aromatic hydrocarbons, vanadium containing source, and ammonium containing source.

23. The system of claim 17, wherein the data processing unit is configured to compare the computed list of m/z peaks to the library that is adaptable to include changes in sources due to aging.

24. A computer implemented method for analyzing mass spectral data associated with a particle comprising:

acquiring mass spectrum data associated with a particle in real-time;

analyzing the acquired mass spectrum data to classify the particle in real-time, wherein, the analyzing comprises comparing the acquired mass spectrum data to a library of known mass spectral fingerprints to obtain a match; and adding or removing new source spectra into the library when detected to interfere with proper classification of the particle.

* * * * *